(12) United States Patent
Jones et al.

(10) Patent No.: US 8,000,074 B2
(45) Date of Patent: Aug. 16, 2011

(54) ELECTRICAL POWER DISTRIBUTION SYSTEM

(75) Inventors: Nicolas Jones, Kitchener (CA); Steve Montgomery, Waterloo (CA); Richard Simpson, Ormond Beach, FL (US); Gregory Baker, Gurnee, IL (US)

(73) Assignee: 2D2C, Inc., Lincolnshire, IL (US)

( * ) Notice: Subject to any disclaimer, the term of this patent is extended or adjusted under 35 U.S.C. 154(b) by 855 days.

(21) Appl. No.: 11/242,878

(22) Filed: Oct. 5, 2005

(65) Prior Publication Data

US 2006/0072271 A1    Apr. 6, 2006

Related U.S. Application Data

(60) Provisional application No. 60/616,188, filed on Oct. 5, 2004.

(51) Int. Cl.
  *H02H 3/08* (2006.01)
(52) U.S. Cl. ........................................... 361/93.1
(58) Field of Classification Search ............ 361/93.1
  See application file for complete search history.

(56) References Cited

U.S. PATENT DOCUMENTS

| | | | | |
|---|---|---|---|---|
| 4,915,639 A * | 4/1990 | Cohn et al. | ...................... | 439/188 |
| 5,225,816 A | 7/1993 | Lebby et al. | | |
| 5,414,587 A * | 5/1995 | Kiser et al. | ...................... | 361/118 |
| 5,428,288 A * | 6/1995 | Foreman et al. | .............. | 324/142 |
| 5,461,288 A * | 10/1995 | Chaves et al. | ............. | 315/241 P |
| 5,524,448 A * | 6/1996 | Schwanebeck et al. | ........ | 62/231 |
| 5,764,523 A * | 6/1998 | Yoshinaga et al. | .............. | 702/61 |
| 5,844,326 A | 12/1998 | Proctor et al. | | |
| 5,861,610 A * | 1/1999 | Weiss | ............................ | 219/497 |
| 5,946,180 A | 8/1999 | Simpson | | |
| 6,049,143 A * | 4/2000 | Simpson et al. | .............. | 307/126 |
| 6,319,051 B1 | 11/2001 | Chang et al. | | |
| 6,552,525 B2 | 4/2003 | Bessler | | |
| 6,692,284 B1 | 2/2004 | Koh | | |
| 6,784,802 B1 | 8/2004 | Stanescu | | |
| 6,857,897 B2 | 2/2005 | Conn | | |
| 6,891,478 B2 | 5/2005 | Gardner | | |
| 2002/0131262 A1* | 9/2002 | Amburgey | ...................... | 362/95 |
| 2003/0045170 A1* | 3/2003 | Ohkawa et al. | ............... | 439/638 |

(Continued)

FOREIGN PATENT DOCUMENTS

AU      2005291729       10/2005

(Continued)

*Primary Examiner* — Jared J Fureman
*Assistant Examiner* — Ann T Hoang
(74) *Attorney, Agent, or Firm* — John S. Paniaguas; Katten Muchin Rosenman LLP

(57) ABSTRACT

An electrical power distribution system for connecting an electrical device to a source of electrical power and disconnecting the electrical device therefrom. The system includes a PCD tag associated with the electrical device, and a PCD reader associated with a receptacle electrically connectable to the source of electrical power. The PCD tag has a PCD tag memory in which data related to the electrical device is stored in a format readable by the PCD reader, the data including an electrical device load rating. The system also has a switch device for connecting and disconnecting the receptacle to the power source. In addition, the system has a measuring device for measuring actual load and a control circuit for comparing actual load to the electrical device load rating. The control circuit provides a disconnect signal to the switch device upon the actual load exceeding the electrical device load rating.

57 Claims, 25 Drawing Sheets

U.S. PATENT DOCUMENTS

| | | |
|---|---|---|
| 2003/0182033 A1 | 9/2003 | Underdahl et al. |
| 2004/0070894 A1* | 4/2004 | Beasley et al. ................... 361/42 |
| 2004/0150525 A1 | 8/2004 | Wilson et al. |
| 2004/0185706 A1 | 9/2004 | Price et al. |
| 2005/0106909 A1* | 5/2005 | Dickie .......................... 439/134 |
| 2005/0184856 A1* | 8/2005 | Pourchot ..................... 340/5.61 |
| 2005/0280970 A1* | 12/2005 | Reynolds ..................... 361/93.1 |

FOREIGN PATENT DOCUMENTS

| | | |
|---|---|---|
| CA | PCT/CA2005/001549 | 2/2006 |
| DE | 19841738 | 3/2000 |
| EP | 1810 375 B1 | 10/2005 |
| WO | WO 2006/037235 | 4/2006 |

* cited by examiner

ELECTRICAL POWER DISTRIBUTION SYSTEM

This application claims the benefit of U.S. Provisional Application No. 60/616,188, filed on Oct. 5, 2004.

FIELD OF THE INVENTION

This invention is related to electrical power distribution systems.

BACKGROUND OF THE INVENTION

AC electrical distribution systems are widely used in residential and commercial settings. Typically, wall-mounted (or otherwise) AC electrical outlets, sockets, or receptacles are provided with which AC electrical appliances are connected. For example, a typical residential electrical power distribution system 20 of the prior art is schematically illustrated in FIG. 1. (As will be described, the remainder of the drawings illustrate the present invention.) The system 20 includes a meter 22 electrically connected to a source of electrical power (not shown). Connected to the meter is a circuit breaker panel 24 (or fuse box). The panel 24 includes a plurality of circuit breakers (or fuses, as the case may be). As is known in the art, electrical safety codes require that properly sized circuit breakers or fuses be used to protect the in-wall permanent wiring. Typically, a master breaker in the circuit breaker panel protects the feed wire and connections.

Pursuant to code requirements generally applicable in North America, the in-wall permanent wiring is minimum 14-gauge copper wire. Electrical devices such as appliances, electronics, lamps, extension cords, and strip outlets often use smaller diameter conductors in their internal wiring. For example, light-duty electrical extension cords incorporating 16-gauge wire are widely available. Typically, these smaller wires are not adequately protected by the branch circuit breakers or fuses. Overloads on smaller diameter wires in extension cords, lamps and other electrical devices can be the result of various causes, for example, improper product design, product life cycle fatigue, product abuse, excessive motor loads, physical damage to the wires, or high AC line voltage. In North America alone, overloads on smaller diameter wires cause thousands of fires every year.

For example, as can be seen in FIG. 1, the circuit breaker panel 24 has a plurality of outlets 26, 28, 30 electrically connected to the panel, and also, each of those outlets has one or more electrical devices (designated D1-D7 in FIG. 1) electrically connected therewith, via receptacles included in the outlets. By way of example, and as shown in FIG. 1, an electrical device D3 is electrically connected to a receptacle 32 in the outlet 26 via an electrical cord 34 and an extension cord 36. The cord 34 leads from electrical device D3 to a plug 38 connected to a receptacle 40 of the extension cord 36, i.e., the plug 38 is received in the receptacle 40. The other end of the extension cord 36 includes another plug which is received in a receptacle in the outlet 26. FIG. 1 also shows electrical devices D1 and D2 electrically connected to each of the receptacles in the wall outlet 28 via electrical cords 42, 44 respectively.

Extension cords are often improperly matched to the appliance load. Where the current flowing through an extension cord exceeds the extension cord's current rating, overheating of the internal conductors in the extension cord results and such overheating can cause burning of cord insulation and materials adjacent to the extension cord, resulting in fires.

FIG. 1 also shows a power strip 46 which is directly connected to a receptacle in the wall outlet 30. Each of devices D4-D7 is connected to power strip 46. As is known in the art, electrical devices D4-D7 can easily cause the circuit including the outlet 30 to overload, eventually resulting in a fire hazard.

For example, in the United States, a typical wall-mounted AC electrical outlet (and each receptacle included therein) is rated to handle 15 amperes of current. As described above, electrical protective devices such as circuit breakers (or fuses) are associated with the outlet, and will "trip" (i.e., disconnect) the outlet if a current overload through the outlet occurs. However, a light-duty extension may be connected to an outlet, and a number of electrical appliances may be connected. However, the extension cord may be rated for only 10 amperes of current. If three appliances are connected, with each appliance operating normally with a five-ampere current load, then all three appliances would draw 15 amperes of current through the extension cord when all three appliances are activated simultaneously. In these circumstances, because the current rating of the extension cord is exceeded, the conductors therein can overheat and cause a fire.

In this example, the circuit breaker does not trip because the current through the outlet has not exceeded the circuit breaker's 15A threshold for the outlet. In this example, therefore, it can be seen that even though the building electrical system, power strip, and each appliance may comply with applicable safety codes respectively, a fire can result from their use, because of how they are used together. In particular, it should be noted that the current overload protection provided by the circuit breaker does not help to avoid a fire in this example.

Other current overload faults can develop in other situations where the conventional overload protection provided by circuit breakers or fuses fails to prevent a fire. For instance, electrical appliances such as televisions, refrigerators, toasters, computers and the like can, and often do, develop internal faults that cause a "hot spot" within the appliance. An example is an appliance in which an electric motor drives rotating or moving parts, for example, in a clothes washing machine. With use over an extended time period, the bearings or bushings wear, and, eventually, lose lubrication. When this happens, the electric current needed to operate the motor increases in order to overcome the increased friction. As a result, the current load drawn by the appliance includes the normal operating current together with fault-induced current. This total current can exceed the current rating of the electrical cord of the appliance but still be insufficient to trip the relevant circuit breaker or fuse. Accordingly, this can result in a fire, because the cord overheats. Also, many appliances include combustible materials internally, which can ignite as a result of current overload.

In addition, improperly installed circuit breakers or fuses can allow unprotected overloads of in-wall wiring, electrical outlets, extension cords, or appliances. For example, if a 20-ampere circuit breaker or fuse is inadvertently installed on a standard branch circuit (i.e., wired with 14 gauge copper wire, typically rated for 15 amperes of current), then overloads can occur throughout the electrical system without proper protection, resulting in overheated wires and, possibly, fire.

In the prior art, residential electrical systems incorporate quick-disconnect power connectors for electrical devices to tap into the electrical distribution network. To minimize the risk of accidental access to high voltages, the wall outlets use female connectors with insulating cover plates. However, these connectors have line voltages which are easily accessible via the insertion of small conductive foreign objects, such as paper clips, hairpins, keys, cutlery or screwdrivers. In North America alone, thousands of persons require treatment for electrical shocks and many people die of electrocution due to contact with these line voltages.

Power distribution systems are subject to voltage variations due to device load switching and environmental changes such as lightning. Over-stressed grids can lead to brown-out and black-out conditions. Long distance electrical distribution can require a high line voltage, such as in rural areas. These various factors often result in power quality aberrations such as unexpected surges in line voltage, lower than acceptable line voltage, and higher than acceptable line voltage. Surge suppressors, such as metal oxide varistors (MOV), have been incorporated into many electrical devices to prevent damage to electronics and motors from sudden surges. However, longer duration, high energy surges can destroy the MOVs and remove the protection. Additionally, high and low line conditions can stress electrical devices and shorten their lives.

Therefore, there is a need for an electrical power distribution system which overcomes or mitigates at least one of the disadvantages of the prior art.

SUMMARY OF THE INVENTION

In its broad aspect, the invention provides an electrical power distribution system for connecting an electrical device to a source of electrical power and for disconnecting the electrical device therefrom. The system includes a PCD tag associated with the electrical device and a PCD reader associated with one or more receptacles electrically connectable to the source of electrical power. The receptacle is adapted to receive a plug electrically connected to the electrical device. The PCD tag includes a PCD tag memory in which data related to the electrical device is stored in a format readable by the PCD reader. The data includes an electrical device load rating for the electrical device. The system also includes one or more switch devices for connecting the receptacle to the power source, and also for disconnecting each receptacle from the power source upon receipt of a disconnect signal. In addition, the system includes a measuring device and a control circuit. The measuring device is for measuring actual load presented through said at least one receptacle by the electrical device. The control circuit is adapted to compare the actual load to the electrical device load rating. Also, the control circuit is adapted to provide the disconnect signal to the switch device upon the actual load exceeding the electrical device load rating.

In another aspect, upon disconnection of the receptacle, the receptacle is in a disconnected condition in which the receptacle is not connectable to the source of electrical power until the receptacle is converted to a reset condition, in which the receptacle is connectable to the source of electrical power.

In yet another aspect, removal of the plug from the receptacle converts the receptacle to the reset condition.

In another aspect, the disconnect signal is provided to the switch device upon the control circuit determining that the actual load exceeds the electrical device load rating over a predetermined time period.

In another of its aspects, the receptacle has a maximum receptacle load rating, and the control circuit is adapted to compare the actual load to each of the electrical device load rating and the maximum receptacle load rating. The control circuit is also adapted to provide the disconnect signal to the switch device upon the actual load exceeding either of the electrical device load rating or the maximum receptacle load rating, whichever is lesser.

The system also provides one or more outlets. The outlet includes one or more receptacles, and has a maximum outlet load rating. The control circuit is adapted to compare the actual load to each of the electrical device load ratings and the maximum outlet load rating, and also to provide the disconnect signal to the switch device upon the actual load exceeding either the electrical device load rating or the maximum outlet load rating.

In yet another of its aspects, the receptacle(s) included in an outlet are electrically connected with a plurality of electrical devices. The control circuit is adapted to compare the actual total load presented by the electrical devices to the maximum outlet load rating, and also to provide the disconnect signal to the switch device upon the actual total load exceeding the maximum outlet load rating.

In accordance with another aspect of the present invention, the data in the PCD tag memory includes a dynamic load profile for the electrical device. In this embodiment, the control circuit compares the actual load over a preselected time period with the dynamic load profile to determine whether the actual load exceeds the dynamic load profile by at least a preselected extent during the preselected time period. Also, the control circuit is adapted to provide the disconnect signal to the switch device upon determining that the actual load exceeds the dynamic load profile by at least the preselected extent during the preselected time period.

In yet another of its aspects, the data in the PCD tag memory includes preselected acceptable arc characteristics of the electrical device. The system additionally includes a source path circuit. The source path circuit includes the electrical device and electrical conductors which are electrically connected between the electrical device and the source of electrical power. Also, the system additionally includes an arc fault indicator circuit associated with the receptacle, for detecting actual arcing activity in the source path circuit. The control circuit is adapted to compare the actual arcing activity over a preselected arcing time period with the preselected acceptable arc characteristics to determine whether the actual arcing activity exceeds the preselected acceptable arc characteristics by at least a preselected margin during the preselected arcing time period. Also, the control circuit is adapted to provide the disconnect signal to the switch device upon determining that the actual arcing activity exceeds the preselected acceptable arc characteristics by at least the predetermined margin during the preselected arcing time period.

In another aspect, the data in the PCD tag memory includes safety certification data. The control circuit is adapted to compare the safety certification data with predetermined certification data, and to provide a connect signal to said at least one switch device upon determining that said safety certification data matches with at least a preselected portion of said predetermined certification data. The connect signal causes the switch device to connect the receptacle with the source of electrical power.

In yet another aspect of the invention, the PCD tag is programmable by the control circuit.

In another aspect, the control circuit writes selected data to the PCD tag memory.

In another of its aspects, the selected data is based on one or more performance characteristics of the electrical device.

In another of its aspects, the PCD tag memory is at least partially erasable by the control circuit, so that the PCD tag is in an unprogrammed condition.

In another of its aspects, the PCD tag is reprogrammable by the control circuit to provide a new load rating for the electrical device based on actual load consumed by the electrical device.

In accordance with another aspect, the system additionally includes a command card adapted to provide one or more command signals readably by the PCD reader. The command signal is transmitted to the control circuit from the PCD reader.

In accordance with another of its aspects, the command signal causes the receptacle to be connected to the source of electrical power and enabled fro a preselected enablement time period.

In another aspect, the command signal causes data in the PCD tag memory to be erased, so that the PCD tag is in an unprogrammed condition.

In another aspect, the programming command signal causes the unprogrammed PCD tag to be programmed by the control circuit to provide a predetermined load rating for the electrical device based on actual load consumed by the electrical device.

In yet another aspect, the system additionally includes a night light. The night light is activatable by the command signal.

In another of its aspects, the receptacle is convertible by the command signal between a locked condition, in which the receptacle is not connectable to the power source, and an unlocked condition, in which the receptacle is connectable to the power source.

In accordance with another of its aspects, the system additionally includes a ground fault detector circuit for detecting a ground fault. The ground fault detector circuit is adapted to provide the disconnect signal to the switch device upon detection of the ground fault.

In another aspect, the system of the invention additionally includes a detector for detecting one or more power faults in the electrical power provided to the receptacle. The detector is adapted to provide the disconnect signal to the switch device upon detection of the power fault. Also, the system additionally includes a means for delaying connection of the receptacle to the source of electrical power for a selected time period after disconnection due to detection of a power fault. In one aspect, the selected time period is selected within a predetermined range based on data in the PCD tag memory read by the PCD reader. In another of its aspects, the selected time period is selected within a predetermined range based on data in the control circuit. Also, in yet another aspect, the selected time period is randomly selected from a predetermined range. Alternatively, the selected time period is systematically selected from a predetermined range. As a further alternative, the selected time period is selected by a central controller so that connection of the receptacle to the source of electrical power is sequential relative to connection of one or more other receptacles to the power source.

In yet another aspect, the data in the PCD tag memory includes minimum acceptable power quality characteristics for the electrical device. The switch device connects the receptacle to the source of electrical power upon the control circuit determining that the minimum acceptable power quality characteristics are satisfied over a predetermined power quality test period.

In accordance with another aspect of the invention, the system additionally includes a memory storage means associated with the receptacle, in which receptacle data related to the receptacle is stored in readable format. The system also includes a means for communication with the memory storage means and the PCD tag, the means for communication being adapted for reading data from the PCD tag memory and for reading the receptacle data.

In yet another aspect, the means for communication is adapted for erasing the data in the PCD tag memory. Also, the means for communication is adapted for reprogramming the PCD tag memory.

In another of its aspects, a plurality of electrical devices are electrically connected to the outlet. Also, the outlet has a maximum outlet load rating. The measuring device measures actual total load presented through the outlet by the plurality of electrical devices. The control circuit is adapted to compare the actual total load to the maximum outlet load rating. Also, the control circuit is adapted to provide the disconnect signal to the switch device upon the actual total load exceeding the maximum outlet load rating.

In yet another aspect, a plurality of electrical devices are electrically connected to the outlet, each electrical device has a respective electrical device load rating. The measuring device measures actual load presented through the outlet by each electrical device respectively. Also, the control circuit is adapted to compare the actual load presented by each electrical device respectively to the respective electrical device load rating for each said electrical device, and to provide the disconnect signal to the switch device upon the actual load consumed by each electrical device respectively exceeding the respective electrical device load rating for each electrical device.

In another aspect, an electrical power distribution system for connecting a plurality of electrical devices to a source of electrical power. The system includes a plurality of outlets, each outlet including one or more receptacles. Each electrical device has a PCD tag associated therewith. Also, each outlet has a PCD reader associated therewith. Each PCD tag includes a PCD tag memory in which data related to each electrical device respectively is stored in a format readable by each said PCD reader respectively. The data includes an electrical device load rating for each said electrical device respectively. Each outlet includes one or more switch devices for connecting each said outlet to the power source and for disconnecting each outlet from the power source upon receipt of a disconnect signal. In addition, each outlet includes one or more measuring devices for measuring actual load presented through each outlet respectively by electrical devices connected to each said outlet respectively. Also, each outlet has a control circuit adapted to compare the actual load to the electrical device load rating for each electrical device connected with each outlet respectively, and to provide the disconnect signal to the switch device upon the actual load exceeding the electrical device load rating.

In yet another aspect, the system also includes a detector associated with each outlet, for detecting one or more power faults in the electrical power provided to each outlet respectively. The detector is adapted to provide the disconnect signal to the switch device in each outlet respectively upon detection of a power fault.

In another of its aspects, the system additionally includes a means for delaying connection of each outlet to the source of electrical power for a selected time period after disconnection due to detection of a power fault.

In yet another aspect, the selected time period is selected by a central controller so that connection of each said receptacle to the source of electrical power is sequential.

The invention also includes a plug electrically connectable to an electrical device, the plug being receivable in a receptacle and electrically connectable therewith. The plug has a PCD tag with a PCD tag memory in which data related to the electrical device is stored in a format readable by a PCD reader associated with the receptacle.

Additionally, the invention includes a PCD tag associated with an electrical device. The PCD tag comprising a PCD tag memory in which data related to the electrical device is stored in a format readable by a PCD reader associated with a receptacle.

In another aspect, the PCD tag is positionable relative to the receptacle in a predetermined position to permit the PCD reader to read said data in the PCD tag memory.

In another of its aspects, the PCD tag is located in an adaptor which is positionable between the receptacle and a plug electrically connected to the electrical device. The adaptor is adapted for electrically connecting the electrical device to the receptacle via the plug.

In yet another aspect, the PCD tag is secured to a plug receivable in the receptacle.

In another of its aspects, the plug is electrically connected to an electric cord adapted for electrically connecting the electrical device to the plug.

In another aspect, the PCD tag is incorporated within a body of the plug.

In yet another of its aspects, the PCD tag is adapted to be attached to the plug.

The invention additionally includes an outlet for connecting one or more electrical devices to a source of electrical power and disconnecting the electrical device therefrom. The outlet includes one or more receptacles electrically connectable to the source of electrical power. The receptacle is adapted to receive a plug electrically connected to the electrical device. The electrical device has a PCD tag associated therewith, and the PCD tag includes a PCD tag memory in which data related to the electrical device is stored. The data includes an electrical device load rating for the electrical device. The outlet also has one or more switch devices for connecting the receptacle to the power source and for disconnecting the receptacle from the power source upon receipt of a disconnect signal. Additionally, the outlet has a control circuit and a measuring device. The measuring device measures actual load presented through the receptacle by the electrical device, and for communicating the measured actual load to the control circuit. Also, the outlet includes a PCD reader for reading at least a portion of the data in the PCD tag memory and communicating the read portion to the control circuit. The read portion includes the electrical device load rating. The control circuit is adapted to compare the actual load to the electrical device load rating, and to provide the disconnect signal to the switch device upon the actual load exceeding the electrical device load rating.

The invention additionally includes a PCD reader associated with the receptacle electrically connectable to a source of electrical power. The receptacle is adapted to receive a plug electrically connected to an electrical device. The least one receptacle has a maximum receptacle load rating. The PCD reader is adapted to read data in a PCD tag memory in a PCD tag associated with the electrical device, the data including an electrical device load rating. The PCD reader is adapted to communicate the data to a control circuit associated with the receptacle.

BRIEF DESCRIPTION OF THE DRAWINGS

The invention will be better understood with reference to the drawings, in which.

DETAILED DESCRIPTION OF THE PREFERRED EMBODIMENT(S)

Figure 1:
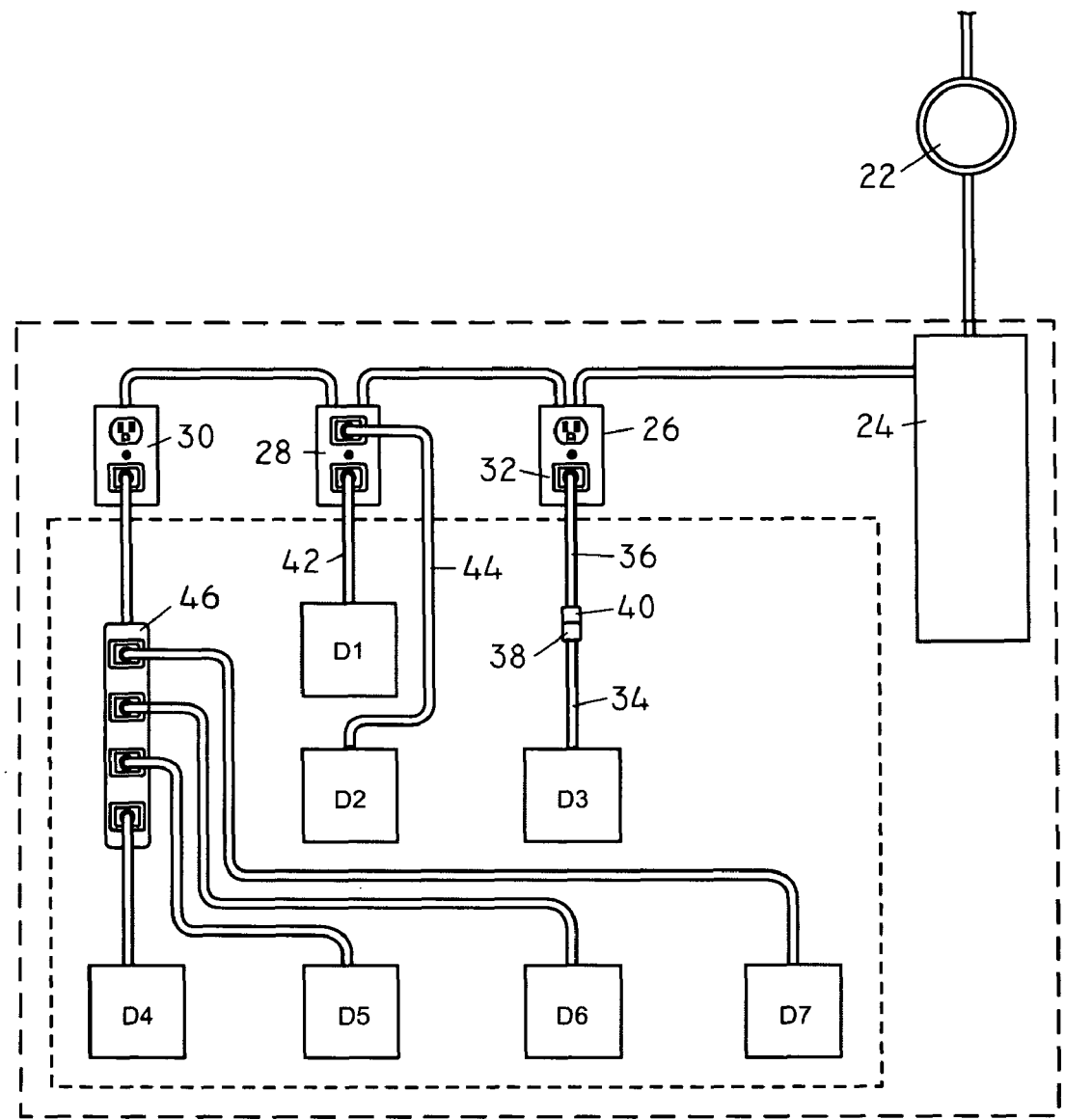
FIG. 1 (also described previously) is a schematic diagram illustrating an electrical distribution system of the prior art.

The present invention may be understood more readily by reference to the following detailed description of the invention and the examples provided herein. It is to be understood that the aspects described below are not limited to specific circuits, outlets, receptacles, plugs, or devices, and as such may, of course, vary. It is also to be understood that the terminology used herein is for the purpose of describing particular aspects only and is not intended to be limiting.

In this specification and in the claims that follow, reference will be made to a number of terms that shall be defined to have the following meanings.

Articles: As used in the specification and the appended claims, the singular forms "a", "an" and "the" include plural references unless the context clearly dictates otherwise.

About: Often, ranges are expressed herein as from "about" one particular value, and/or to "about" another particular value. When such a range is expressed, another embodiment includes from the one particular value and/or to the other particular value. Similarly, when values are expressed as approximations, by use of the antecedent "about", it will be understood that the particular value forms another embodiment. It will be further understood that the endpoints of each of the ranges are significant both in relation to the other endpoint, and independently of the other endpoint.

Optional: "Optional" or "optionally" means that the subsequently described event or circumstance may or may not occur, and that the description includes instances where the event or circumstance occurs and instances where it does not.

Electrical Device: "Electrical Device" means any device which can be electrically connected in a circuit and which can draw current or pass current. "Electrical device" can include any component (e.g., such as a damaged extension cord) which, even if not activated, nonetheless can draw actual current.

PCD Tag: A proximity-coupled device containing data that can provide access to that data to a PCD reader when in close proximity. Effectively, a contactless memory storage device.

PCD Reader: A proximity-coupled device or circuit that can read and/or write data from/to a PCD tag.

Receptacle: A set of connector sockets that provides a means to connect electrical devices equipped with a compatible plug to a source of electricity.

Plug: A set of connector pins/blades that provides a means to connect an attached electrical device to a source of electricity by way of a compatible receptacle.

Electrical Device Load Rating: The limit for normal current or power consumption for an electrical device under normal operating conditions (e.g., 10 Amps 1250 Watts 125 Volts).

Switch Device: A means to connect and disconnect the path of an electrical circuit.

Load: Current drawn or power consumed.

Measuring Device: A means for directly or indirectly determining the value of a parameter.

Control Circuit: A means for accepting data or inputs, collecting data, storing and retrieving data, making decisions or calculations, and setting an output level or state based upon the data, choice or result.

Outlet: Electrical wiring device containing at least one receptacle. Provides a means for the quick connection and disconnection of an electrical device to an electrical distribution system. For example, the outlet could be an in-wall outlet or in an extension cord or a power strip.

Electrical Conductors: An object for passing current from one location to another, typically, wires of highly conductive metals.

Programmable: A device, storage means or data value is "programmable" if it can be adjusted, configured or changed.

Command Card: A PCD tag in a format suitable for manual handling. Data contained therein is accessible by a PCD Reader.

Unprogrammed Condition: A programmable device, storage means or associated data storage location which contains a predetermined data value assigned to represent "no data" is an unprogrammed condition.

Reprogrammable: A programmable device, storage means or data value that may be programmed, programmed subsequent to prior programming and returned to an unprogrammed condition.

Maximum Load Rating: Quantitative designation representative of the maximum current or power that can be consumed without fault or failure of the electrical device.

Reference is first made to FIGS. 2-13A to describe an embodiment of an electrical power distribution system in accordance with the invention indicated generally by the numeral 115. The electrical power distribution system 115 is for connecting an electrical device 117 to a source of electrical power (not shown) and disconnecting the electrical device 117 therefrom. The system 115 preferably includes a PCD tag 119 associated with the electrical device 117, as will be described. Also, the system includes a PCD reader 121, one or more switch devices 123, a measuring device 125, and a control circuit 127. As will also be described, the PCD reader 121 is associated with one or more receptacles 129 which are electrically connectable to the source of electrical power. Each receptacle 129 is adapted to receive a plug 131 electrically connected to the electrical device 117, as is known in the art. Preferably, the PCD tag 119 includes data storage means in which data related to the electrical device 117 is stored in a format readable by the PCD reader 121. The data in the PCD tag 119 preferably includes, at a minimum, an electrical device load rating (i.e., a maximum load rating) for the electrical device 117.

The switch device 123 connects the receptacle 129 to the power source, and also disconnects the receptacle 129 from the power source upon receipt of a disconnect signal, as will be described. Upon disconnection, the receptacle 129 is in a disconnected condition. Also, the measuring device 125 measures actual load presented through the receptacle 129 by the electrical device 117. Preferably, the control circuit 127 compares the actual load to the electrical device load rating, and the control circuit 127 is also adapted to provide the disconnect signal to the switch device 123 upon the actual load exceeding the electrical device load rating.

For the purposes hereof, "disconnected condition" means that the receptacle is disconnected from the source of electrical power due to detection of a fault condition, and also that the receptacle cannot be connected to a source of electrical power until the plug through which the fault condition occurred (i.e., to cause the disconnected condition) is removed from the receptacle. Removal of the plug converts the receptacle to a reset condition, in which the receptacle is connectable to the source of electrical power.

Figure 12:
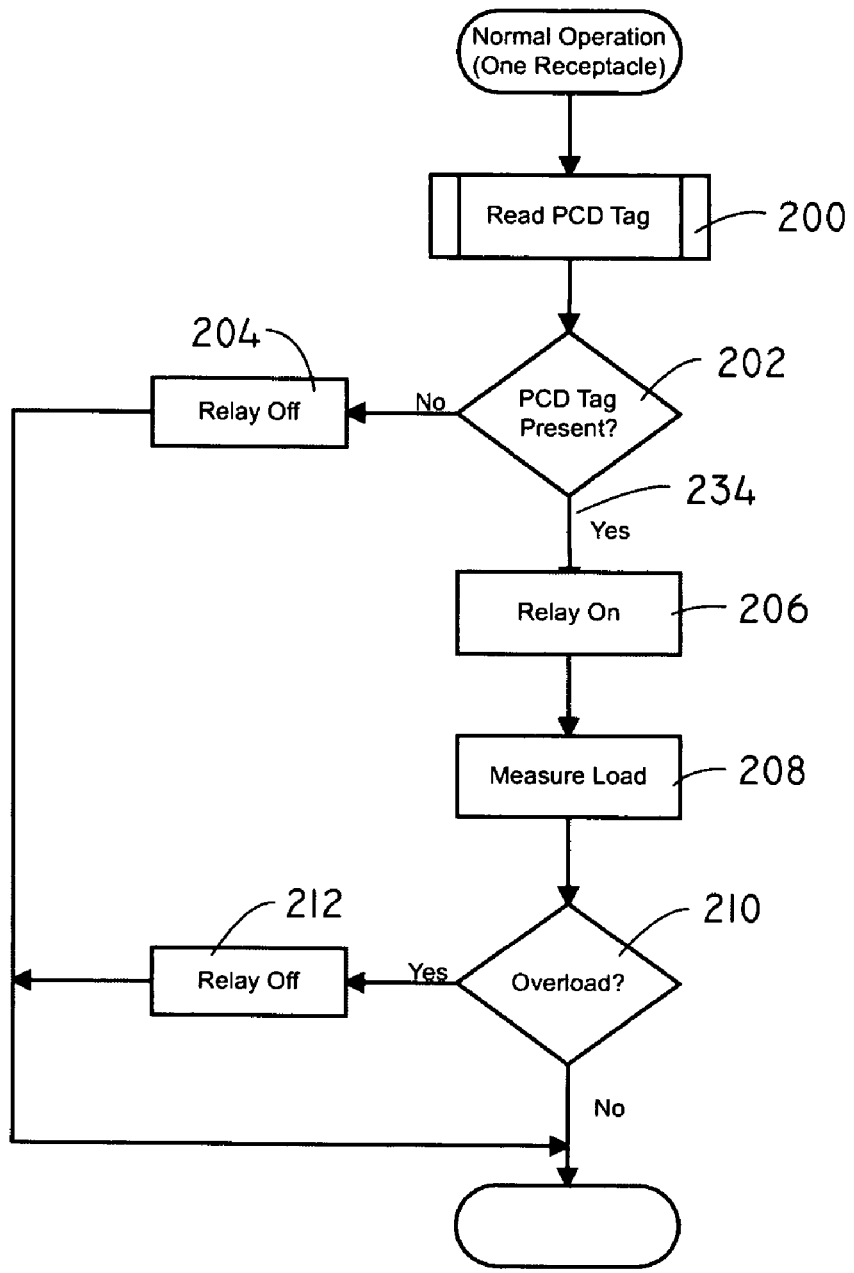
FIG. 12 is a flow chart illustrating a method of using an embodiment of a system of the invention.

In use, when the PCD tag 119 is brought within the coupling range of the PCD reader 121, the steps illustrated in FIG. 12 are taken. At step 200, the PCD reader 121 reads the PCD tag memory in the PCD tag 119. At step 202, the control circuit 127 determines whether the electrical device 117 is capable of safe connection with the receptacle 129 and otherwise meets any other preconditions, as will be described. If the electrical device 117 is acceptable, then the PCD reader 121 obtains the electrical device load rating for the electrical device 117. If the PCD tag 119 is not present or if the data in the PCD tag memory indicates that the electrical device 117 is not compatible with the receptacle 129 (or otherwise fails to meet a selected precondition), then the switch device 123 remains open (step 204), and the receptacle 129 is not connected to the source of electrical power.

If the data in the PCD tag memory indicates that the electrical device 117 is acceptable for the receptacle 129, then the switch device 123 is closed (step 206), connecting the receptacle 129 to the source of electrical power.

The measuring device 125 measures actual load (step 208). Actual load is compared to the electrical device load rating (step 210) by the control circuit 127, and if the actual load exceeds the electrical device load rating, then the control circuit 127 sends the disconnect signal to the switch device 123 (step 212), thereby causing the switch device to disconnect the receptacle 129 from the source of electrical power.

It will be understood that the measuring device may measure current or apparent power or true power, as is known in the art.

Figure 13A:
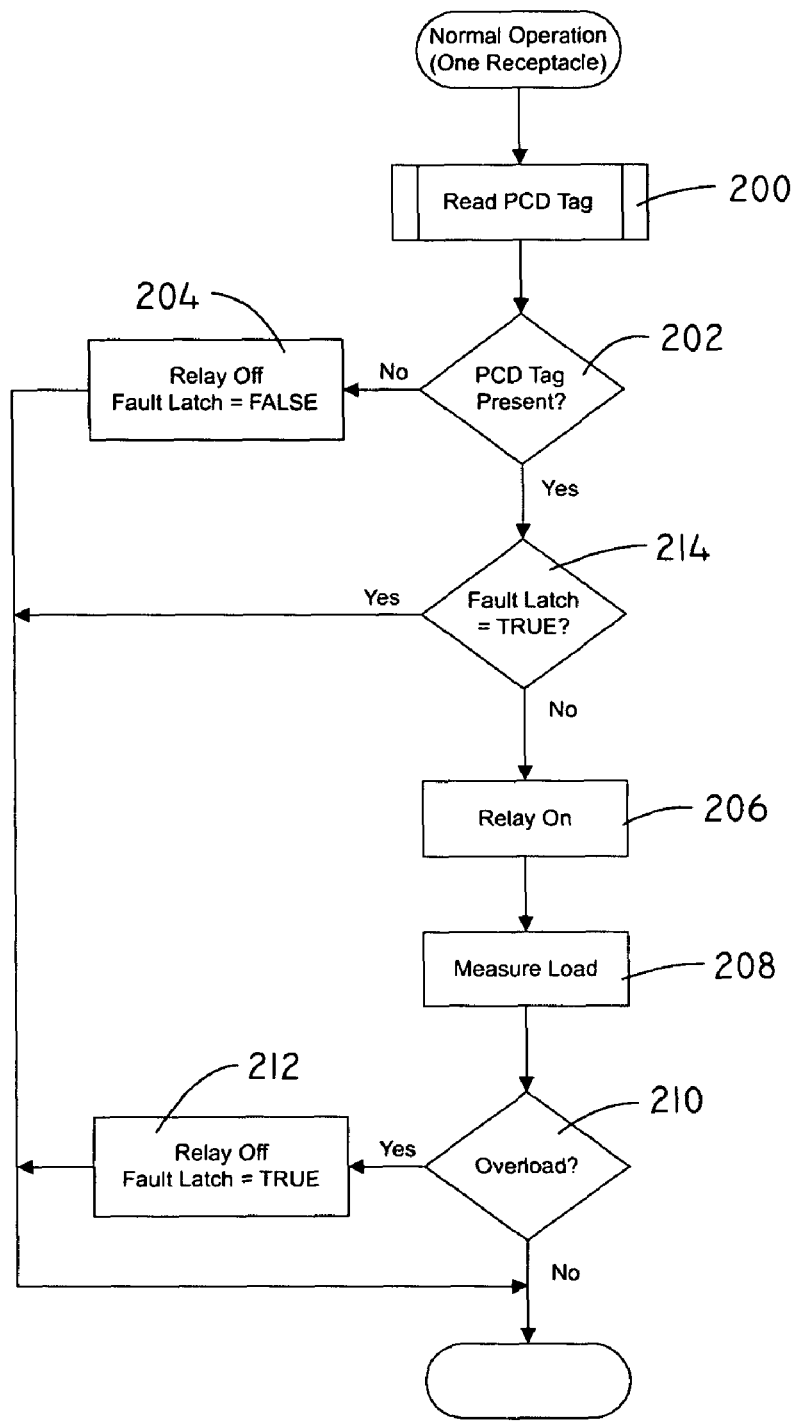
FIG. 13A is a flow chart illustrating a method of using an alternative embodiment of a system of the invention.
Figure 13B:
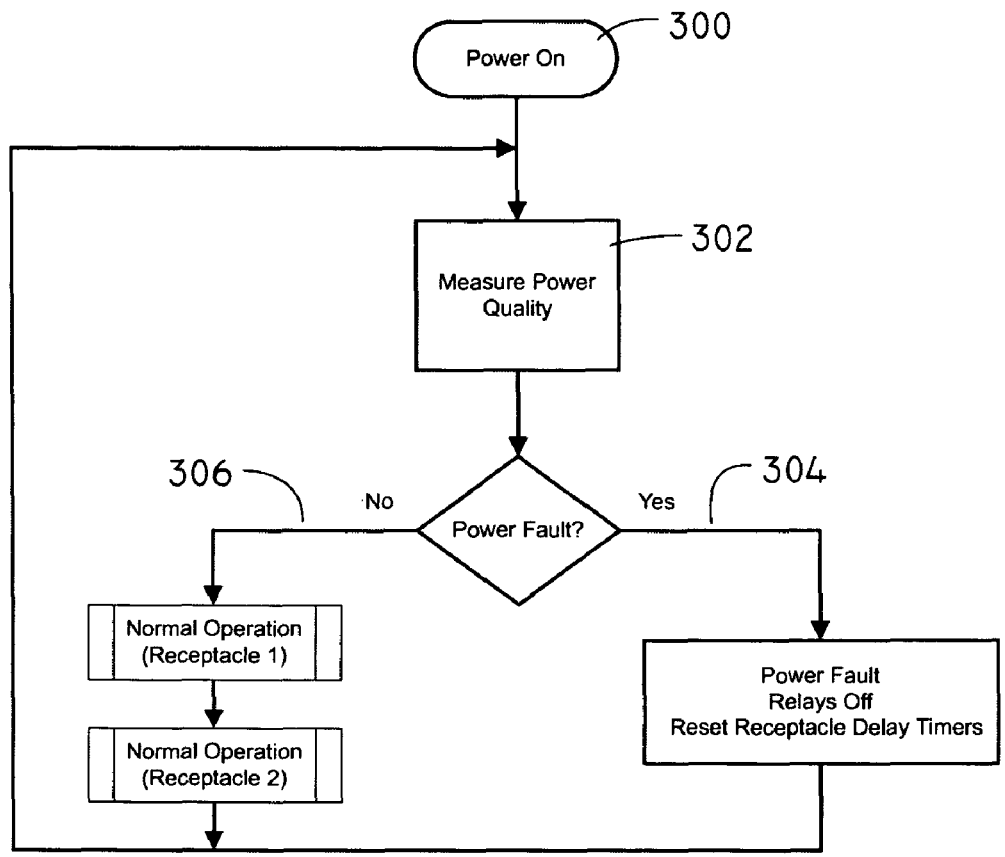
FIG. 13B is a flow chart illustrating a method of using another alternative embodiment of the system of the invention.
Figure 13C:
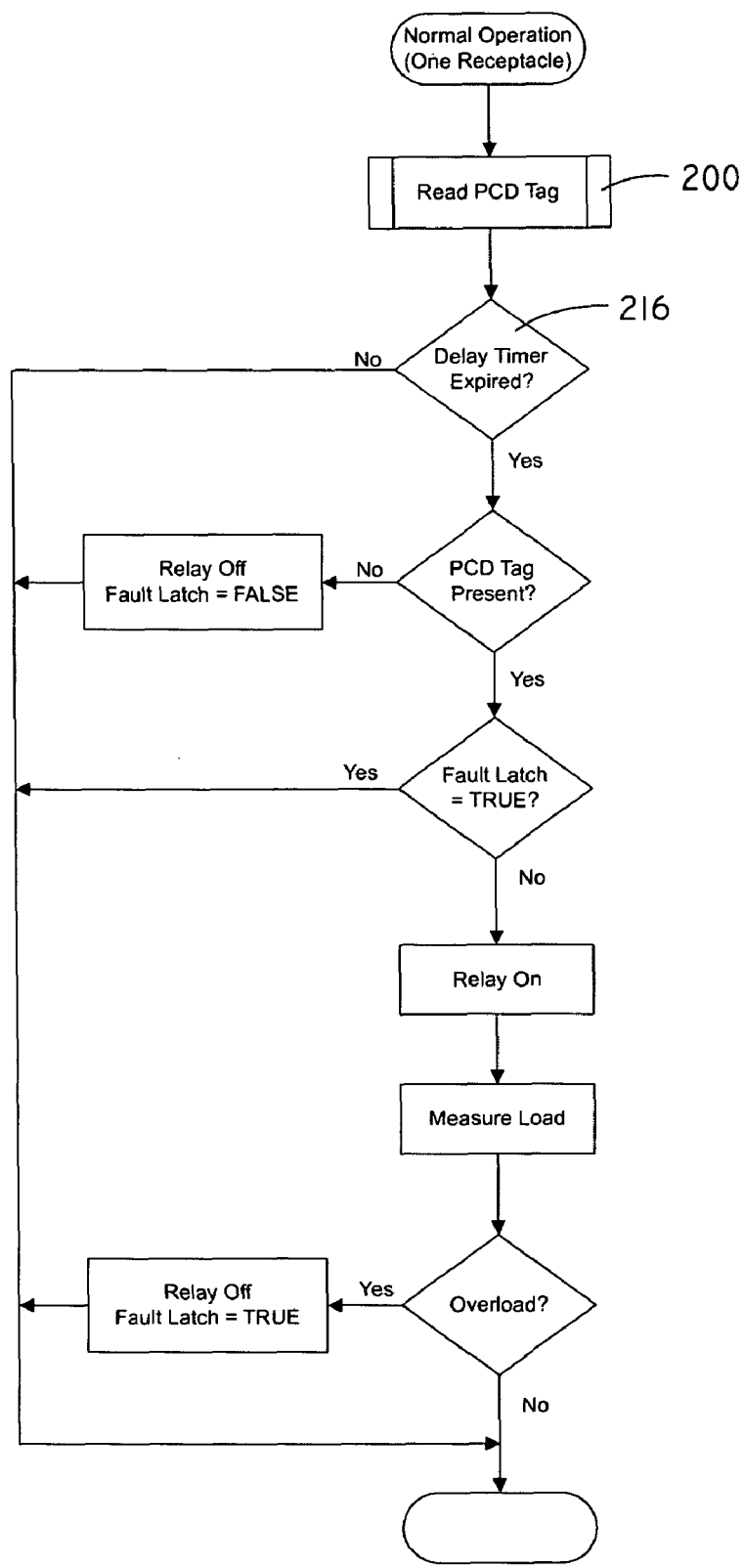
FIG. 13C is a flow chart illustrating a method of using another alternative embodiment of the system of the invention.

Upon disconnection of the receptacle 129 due to a fault, the receptacle is in a disconnected condition. The disconnected condition is designated in FIG. 13A by "Fault Latch=TRUE", in step 212. As can be seen in FIG. 13A, "disconnected condition" means that the receptacle is disconnected from the source of electrical power, and also that the receptacle cannot be connected to a source of electrical power until the plug through which the overload occurred to result in the disconnected condition is removed from the receptacle. Preferably, upon removal of the plug from the receptacle, the receptacle is thereby converted to a reset condition, in which the receptacle is connectable to the source of electrical power. Accordingly, once the receptacle is in the disconnected condition, the receptacle is not connectable to the source of electrical power until the receptacle is converted to a reset condition. As shown in FIG. 13A, if the receptacle is in the disconnected condition, then after the PCD reader has determined that the Fault Latch parameter is true (step 214)—i.e., if the plug which caused the disconnection has not been removed from the receptacle—then the switch device 123 remains open (off). However, if in step 214 the fault latch is not activated, then the switch device 123 is closed (step 206), to connect the receptacle 129 to the power source.

Preferably, the disconnect signal is provided to the switch device 123 upon the control circuit 127 determining that the actual load exceeds the electrical device load rating over a predetermined time period, as will be described.

In another embodiment, the receptacle 129 has a maximum receptacle load rating and the control circuit 127 is adapted to compare the actual load to each of the electrical device load rating and the maximum receptacle load rating respectively. Upon the actual load exceeding either of the electrical device load rating or the maximum receptacle load rating—whichever is the lesser—the control circuit provides the disconnect signal to the switch device 123.

The system 115 preferably also includes one or more outlets 135. Each outlet 135 includes one or more receptacles 129, and each outlet has a maximum outlet load rating (i.e., a maximum load rating). The control circuit 127 is adapted to compare the actual load to each of the electrical device load rating and the maximum outlet load rating. Upon the actual load exceeding either of the electrical device load rating or the maximum outlet load rating—whichever is the lesser—the control circuit provides the disconnect signal to the switch device 123.

Alternatively, the outlet(s) of the system 115 are electrically connected with a plurality of electrical devices 117. The control circuit 127 is adapted to compare the actual load (i.e., the actual total load presented by the electrical devices) to the maximum outlet load rating. The disconnect signal is provided to the switch device 123 by the control circuit 127 upon the actual load exceeding the maximum outlet load rating.

Certain of the components of the system 115 will now be described in more detail.

1. The PCD Tag and the PCD Reader

Figure 5:
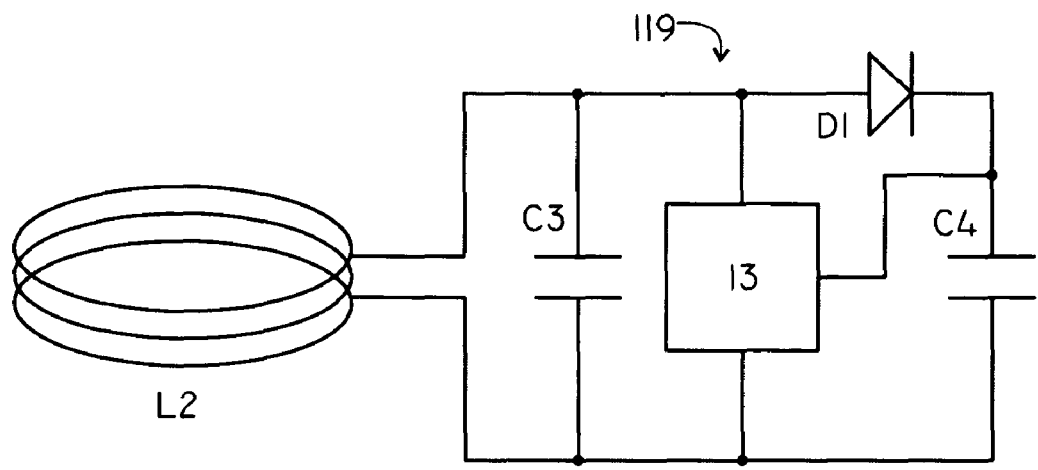
FIG. 5 is a schematic diagram of an embodiment of a PCD tag of the invention.

As can be seen in FIG. 5, the PCD tag 119 includes an inductive coupler (L2), a resonance circuit consisting of C3 and L2, a transponder 13, and a rectifier circuit for DC power supply (D1, C4). Preferably, the resonance circuit operates at a nominal frequency of 13.56 megaHertz.

Figure 8:
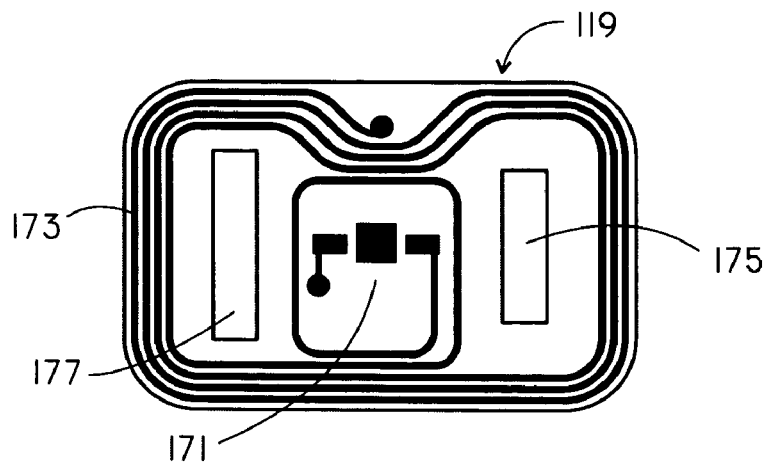
FIG. 8 is a plan view of an embodiment of the PCD tag circuit board of the invention.

Preferably, a physical embodiment of the PCD tag is a coiled trace (L2) on a printed circuit board (PCB) with C3, C4, D1, and transponder 13 contained within an integrated circuit wire bonded to the PCB (see FIG. 8). As will be described, the PCD tag 119 preferably is placed inside the electrical device plug at the time of manufacture, retrofitted to the face of an existing electrical device plug, or built into an in-line electrical adaptor plug which is attachable to the end of an existing electrical device plug.

The PCD tag 119 preferably has an intentionally limited coupling range relative to the PCD reader 121. Thus, the PCD tag also serves as a "proximity" detector by functioning only when the inductive coupling coil (L2) is close to the matching inductive coupler coil (L1) installed in an electrical outlet 135. The design of the PCD reader 121 and PCD tag 119 is such that the maximum read range is limited.

Figure 6:
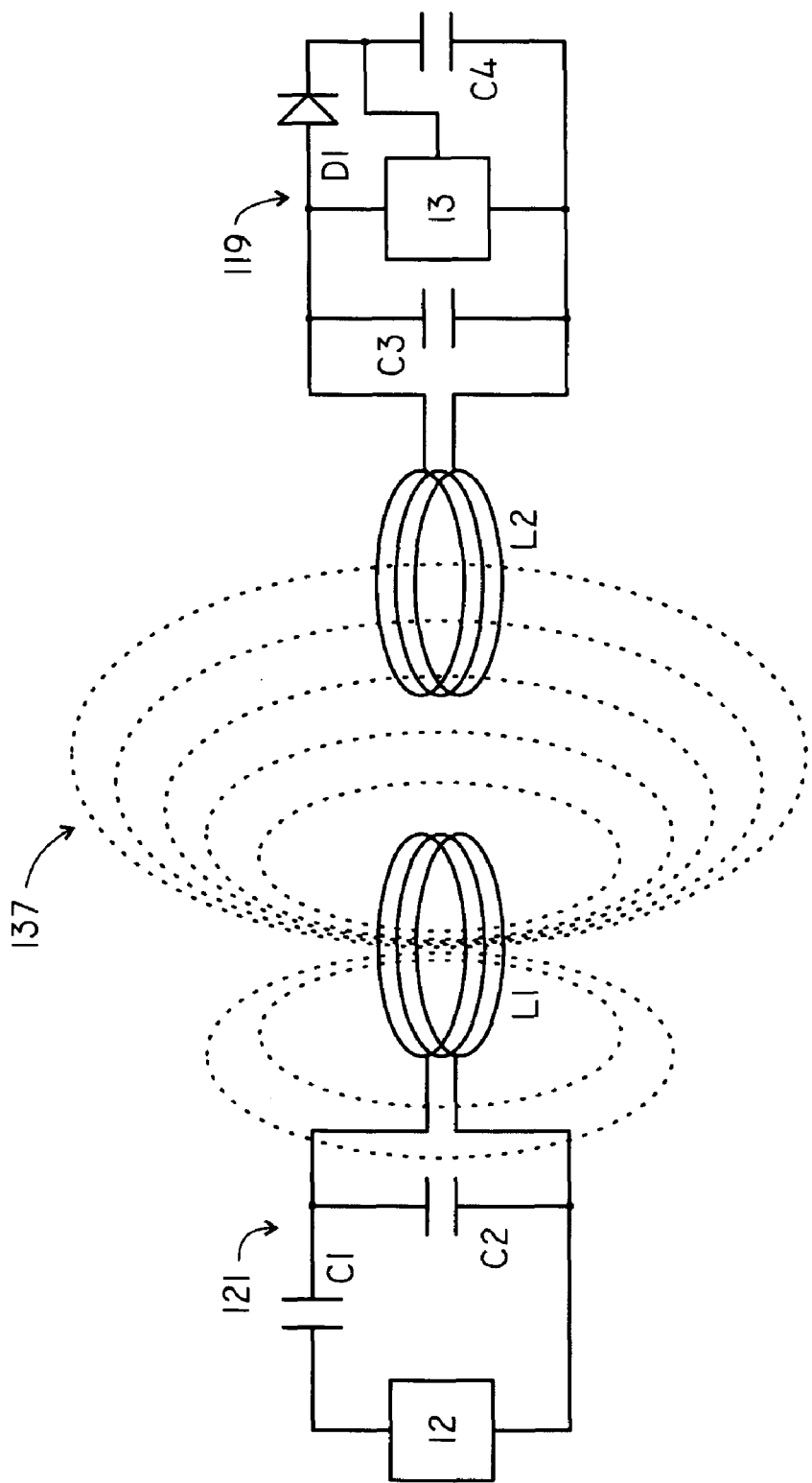
FIG. 6 is a schematic diagram illustrating the PCD tag of FIG. 5 and the PCD reader of FIG. 4 cooperating to form a proximity-coupled data storage and retrieved system.

In general terms, and in the preferred embodiment, the PCD reader 121 periodically generates an alternating magnetic field 137 that matches the 13.56 megaHertz resonant frequency of the PCD tag 119 (FIG. 6). The magnetic field is used both to power the PCD tag 119 and retrieve information stored therein, i.e. in the PCD tag memory. The PCD tag memory contains information including about the device, for example, preferably maximum load rating of the device, dynamic load profile, serial number, and validation information, as will be described.

Figure 4:
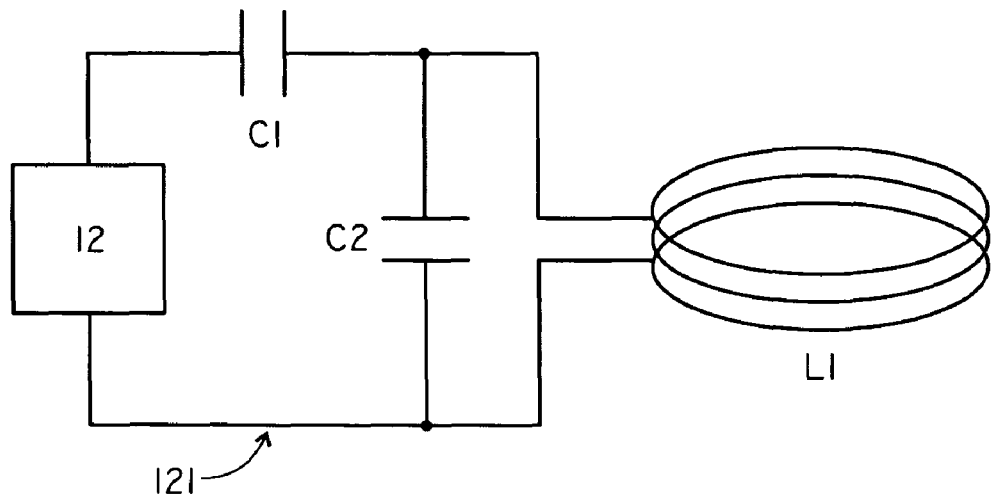
FIG. 4 is a schematic diagram of an embodiment of a PCD reader of the invention.

The proximity coupling enables communication without electrical connection between the plug 131 and the outlet 135 (FIG. 6). The outlet 135 can read or write data in the PCD tag 119 (FIG. 5) by means of the PCD reader 121 (FIG. 4). The PCD reader 121 has a contactless memory reader circuit 7, an antenna multiplexer and impedance matching circuit 8, and an inductive proximity coil L1. The impedance matching circuit 8 consists of capacitors C1 and C2. C1 and C2 together with inductor L1 form a resonance circuit, preferably at 13.56 MHz, in the PCD reader circuit 121. Capacitor C3 and L2 form a resonant circuit at 13.56 MHz in the PCD tag 119. Capacitor C4 and diode CR1 create a DC supply to power the PCD tag transponder circuit 13. The PCD reader 121 (FIG. 4) sends either a "read" or "write" command (FIG. 6) to the PCD tag 119 (FIG. 5) modulated within the 13.56 MHz signal. The PCD tag 119 sends back a response to the PCD reader 121 by modulating the 13.56 MHz carrier. In this embodiment, one coupling coil (L1a, L1b) is used for each receptacle.

Preferably, the PCD tag is provided with data in PCD tag memory. Alternatively, the PCD tag may be provided unprogrammed.

It will be understood by those skilled in the art that various configurations could be used to create a proximity coupling device, and that the embodiment shown in FIGS. 4-6 is exemplary only.

2. The Outlet

Figure 7:
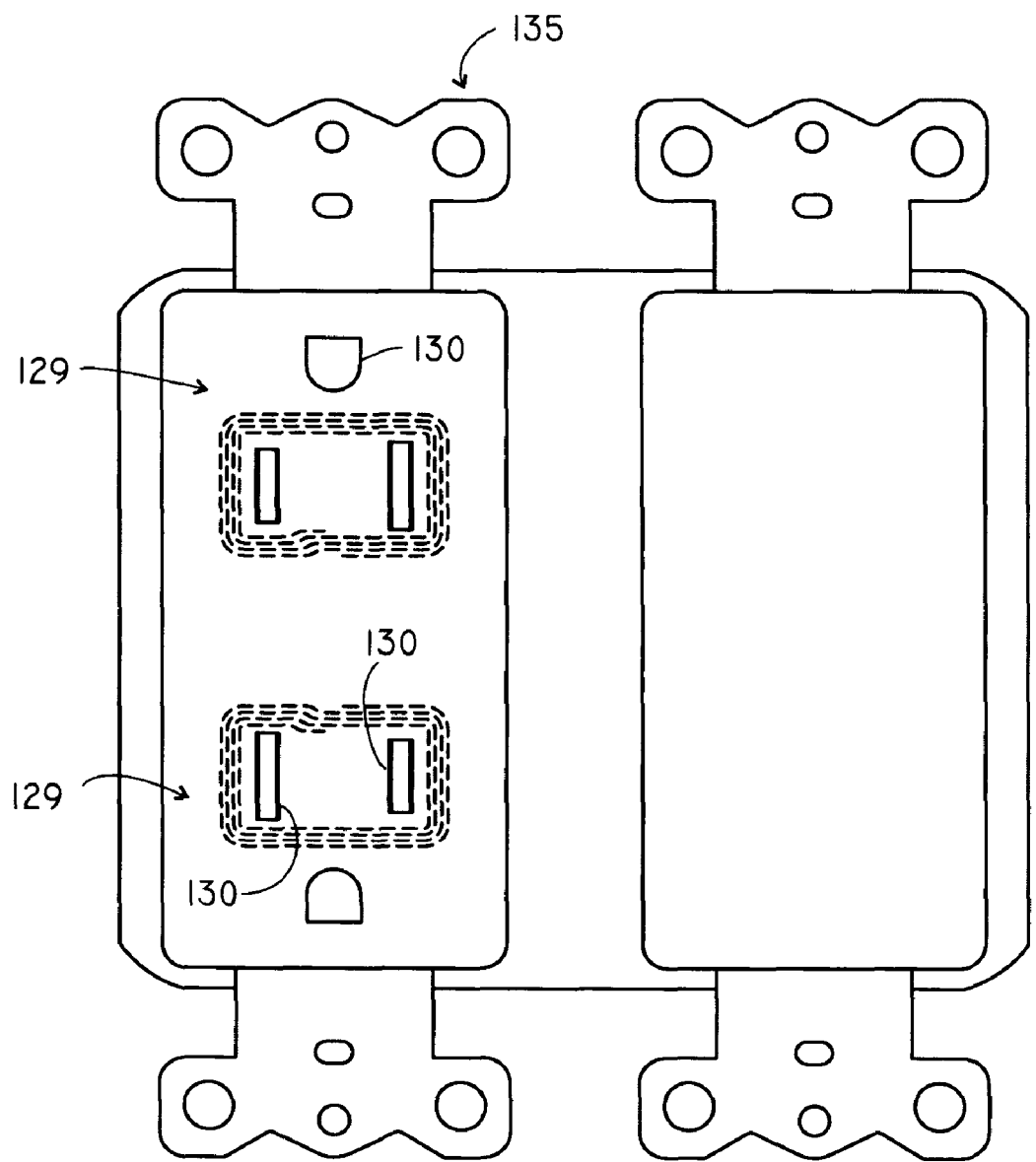
FIG. 7 is a front view of an embodiment of an outlet of the invention showing antennas of the PCD reader therein.

As shown in FIG. 7, the outlet 135 contains two receptacles 129. It will be understood that the outlet 135 may contain any number of receptacles, however. For exemplary purposes only, the block diagram of FIG. 2 refers to an outlet with two receptacles.

Figure 21:
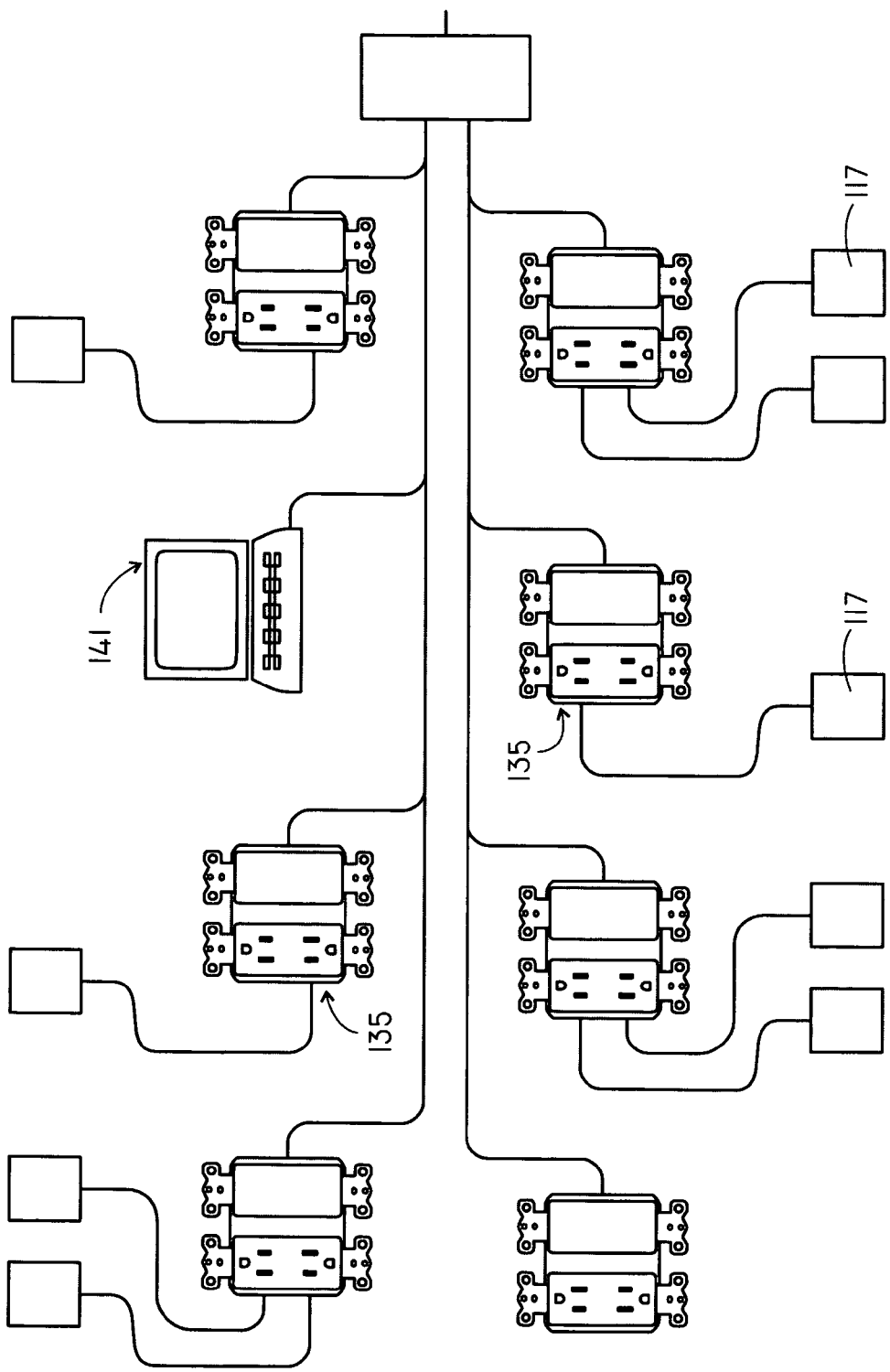
FIG. 21 is a diagram schematically representing another alternative embodiment of the system of the invention.

In general, and as can be seen in FIG. 7, the outlet of the invention preferably is a quick-disconnect wiring device for connecting electrical devices 117 to an electrical distribution system (FIG. 21). As will be described herein, the outlet 135 provides protection against fires, shocks, and electrical device damage. By way of example, in the two-receptacle outlet embodiment shown in FIG. 2, AC power enters the circuit at connections La, Lb, N and G. Electrical devices 117 attach through two standard connector receptacles 129 shown as sockets 130 Lr, Nr, and G. A switch device 123 exists between the live source (L) and the receptacle live socket (Lr). The outlet 135 includes a control circuit 127 which monitors the current flowing to each of the two receptacles 129 the live voltage, the neutral voltage and the ground voltage. The control circuit 127 reads data contained in a PCD tag 119 associated with an electrical device plug 131 through coupling coils L1 and L2 and determines whether to close or open the switch device 123.

The receptacle 129 preferably includes sockets 130 for live, neutral and ground connections as is known in the art.

The control circuit 127 preferably includes controller 4, load sensor signal conditioning circuit 6, power supply circuit 5, switch device driver circuits 9 and 10, contactless memory reader circuit 12, antenna multiplexer and impedance matching circuit 8. Optionally, the control circuit 127 may also include a communication interface, and/or a home automation communication interface.

The preferred embodiment of the switch device 123 is a magnetic relay switching device. It will be understood by those skilled in the art that various configurations could be used to create a switching device including, for example, semiconductor, mechanical, or electromechanical means.

Figure 2:
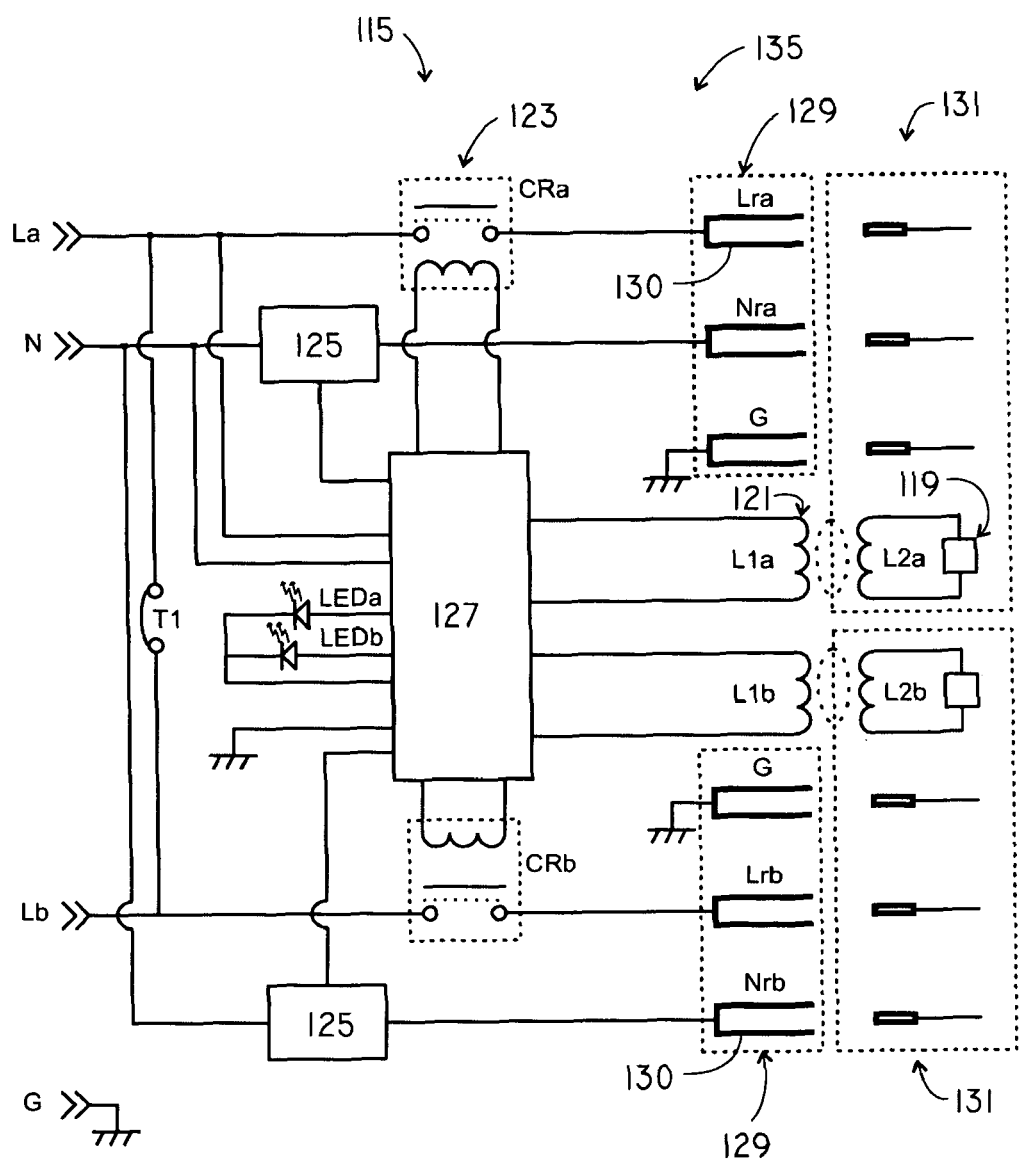
FIG. 2 is a block diagram of an embodiment of a system of the invention including an outlet with a control circuit.
Figure 3:
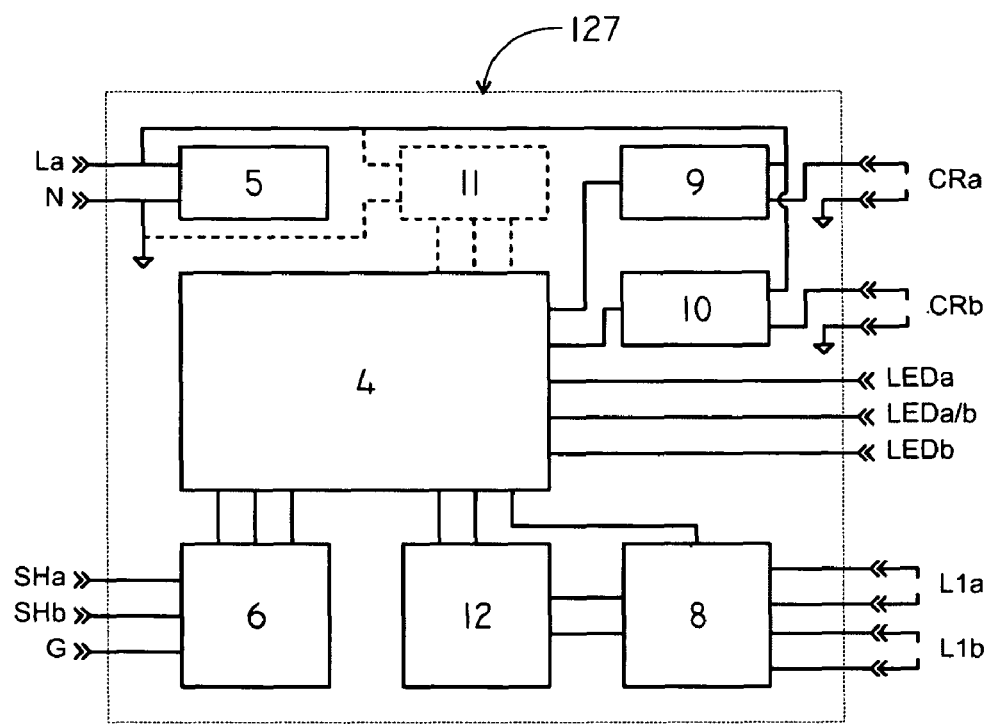
FIG. 3 is a block diagram of the control circuit 127 of FIG. 2.

In FIG. 2, the connections La, Lb, N and G represent attachment junctions to structure branch circuit Live A wire, optionally Live B wire, neutral return wire and earth ground wire. Typically, the live wire(s) connect to AC power through a circuit breaker or panel fuse for protection of the permanent wiring circuit. The Neutral wire is usually connected to other neutral wires at the breaker/fuse panel and bonded to earth ground. Ground would normally be connected to other ground wires at the breaker/fuse panel and also to the earth. These La, Lb, N and G connections are either permanent wiring connections, such as screw terminals or pigtail type short exposed wires, or quick-disconnect connections, such as a plug, depending on the application of in-wall outlet, power tap, extension cord, strip outlet, or device with electrical pass-through outlet. In FIG. 2, the breakaway tab T1 included in the in-wall outlet embodiment allows a user (not shown) to connect two separate live supply circuits to one outlet as is known in the art.

Also, the connections Lr, Nr and G (as shown in FIG. 2) represent standard female receptacle connections for an electrical socket. This embodiment incorporates two receptacles, each contain one of each of Lr, Nr, and G sockets.

In FIG. 2, CRa and CRb represent power control relays (switch devices 123), one for each receptacle 129. The switch devices 123 connect the live source (La, Lb) to the live receptacle socket (Lra, Lrb). In this embodiment, the switch devices are normally open to prevent accidental shock from insertion of conductive objects in the receptacle sockets 130 and to prevent damage to appliances during poor power quality conditions. These switch devices 123 are actuated by the controller 4 through switch device drivers 9, 10

To minimize the risk of shocks, the switch device 123 is normally kept open. Thus no line level voltages are normally present at an unoccupied receptacle socket 130. As noted above, the PCD reader 121 has an intentionally limited coupling range relative to the PCD tag 119. Thus the PCD reader 121 and the PCD tag 119 together serve as a "proximity" detector by only functioning when the inductive coupling coil (L2) is close to the matching inductive coupler coil (L1) installed in the electrical outlet. The proximity limit improves shock protection by keeping switch devices 123 off until the plug face is within a short gap of the outlet face and by preventing misreads caused by nearby PCD tags. Since data can only be read from the PCD tag 119 in close proximity, no line level voltages are normally present on a partially inserted plug blade.

In FIG. 2, LEDa and LEDb represent indicators driven by the controller 4 to help convey outlet or system status. Preferably, status indications include any or all of the following: power quality good; power quality bad; no power, power connected to the electrical device; power disconnected from the electrical device; PCD tag contains invalid data; excess current draw by the electrical device; excess current draw through outlet; data ready to write to a PCD tag; PCD tag missing or damaged; the plug is not inserted in the outlet.

To detect proper wiring of the outlet 115 (i.e. live source wire to live connection, neutral source wire to neutral connection), the control circuit 127 compares Neutral (N) voltage level and a Live (La) voltage level to ground voltage. If the wiring to the safety outlet is reversed, the controller 4 will not allow the switch devices 123 to close indicating that the outlet is improperly installed.

It will be understood that the invention can address various problems in power distribution. For instance, and as will be described, to provide device protection from power quality faults such as surges, low line voltage and high line voltage, the control circuit 127 preferably monitors the line voltage. As soon as it detects the line voltage dropping below a low level threshold or going above a high level threshold, the control circuit 127 removes the drive signal(s) to the power switch device(s) 123 to disconnect AC line power supplied to devices. The control circuit 127 continues to monitor the line voltage level. After the line voltage returns to an acceptable level, the control circuit 127 closes the switch device 123 on the top receptacle if the PCD tag 119 is present and then closes the switch device 123 bottom receptacle if the PCD tag 119 is present and the electrical device data is consistent with the receptacle load rating.

In one embodiment, once the receptacle 129 is connected with the source of electrical power (step 300 in FIG. 13B), the control circuit 127 proceeds to measure power quality (step 302). If a power fault is detected (step 304), then the switch device(s) 123 receives the disconnect signal and disconnects the outlet from the power source. Receptacle delay timers are reset to provide a predetermined interval before the power quality is checked again (step 302) by the control circuit 127. However, if no power fault is detected (step 306), then the outlet 135 continues with normal operation.

Figure 13D:
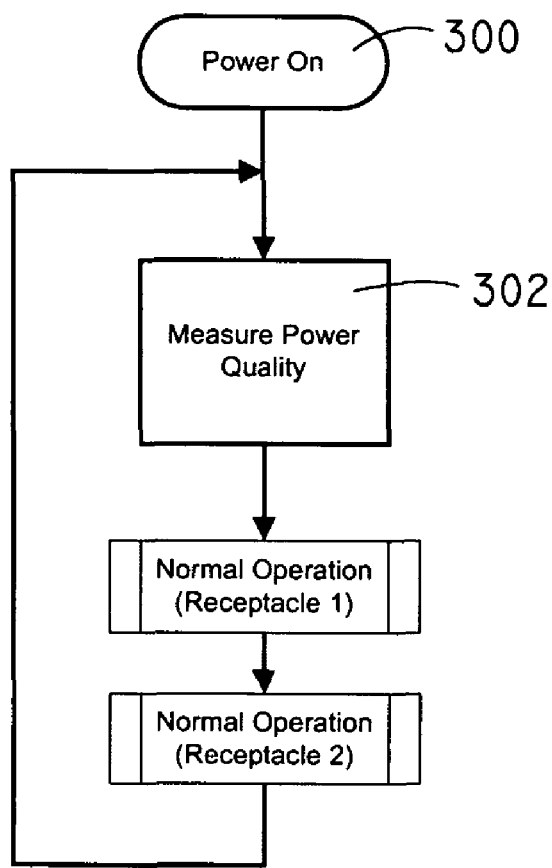
FIG. 13D is a flow chart illustrating a method of using another alternative embodiment of the system of the invention.
Figure 13E:
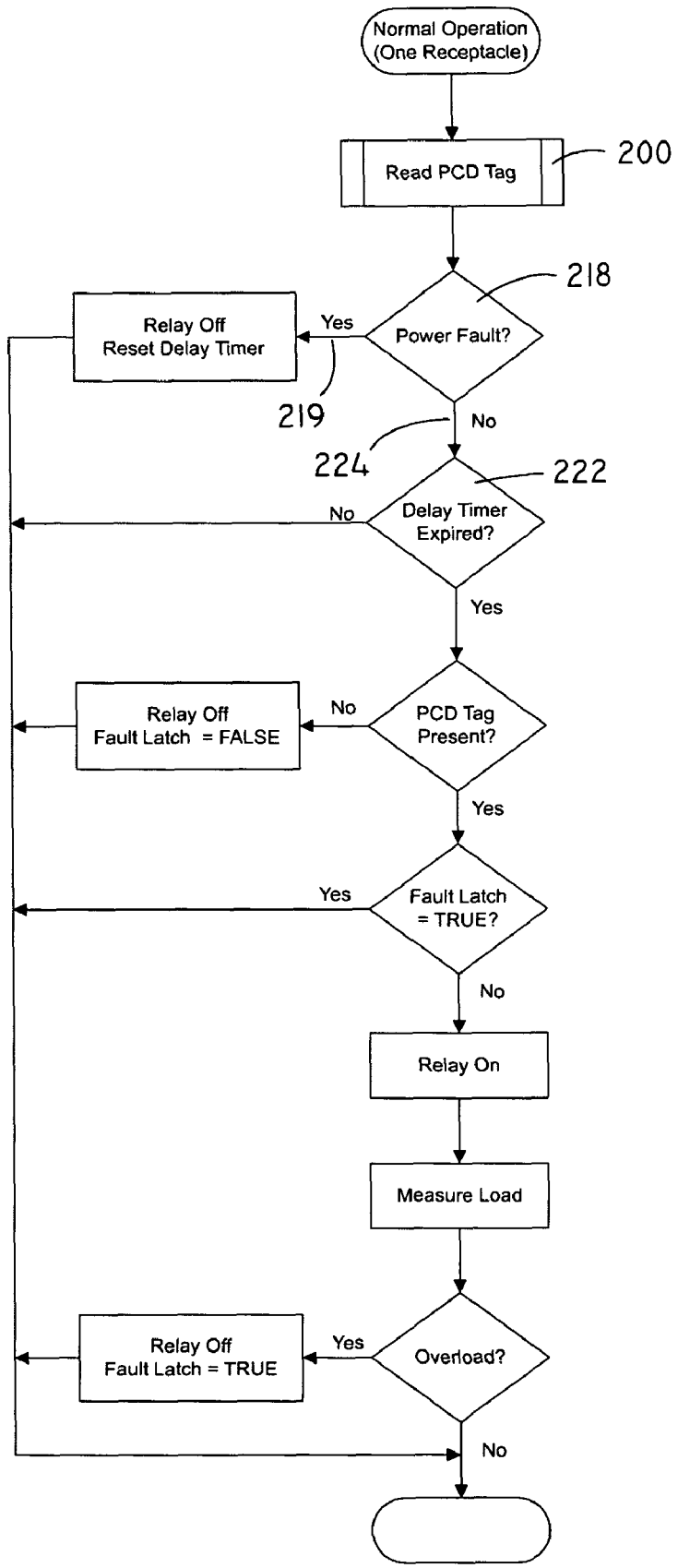
FIG. 13E is a flow chart illustrating a sub process step included in FIG. 13D.
Figure 13F:
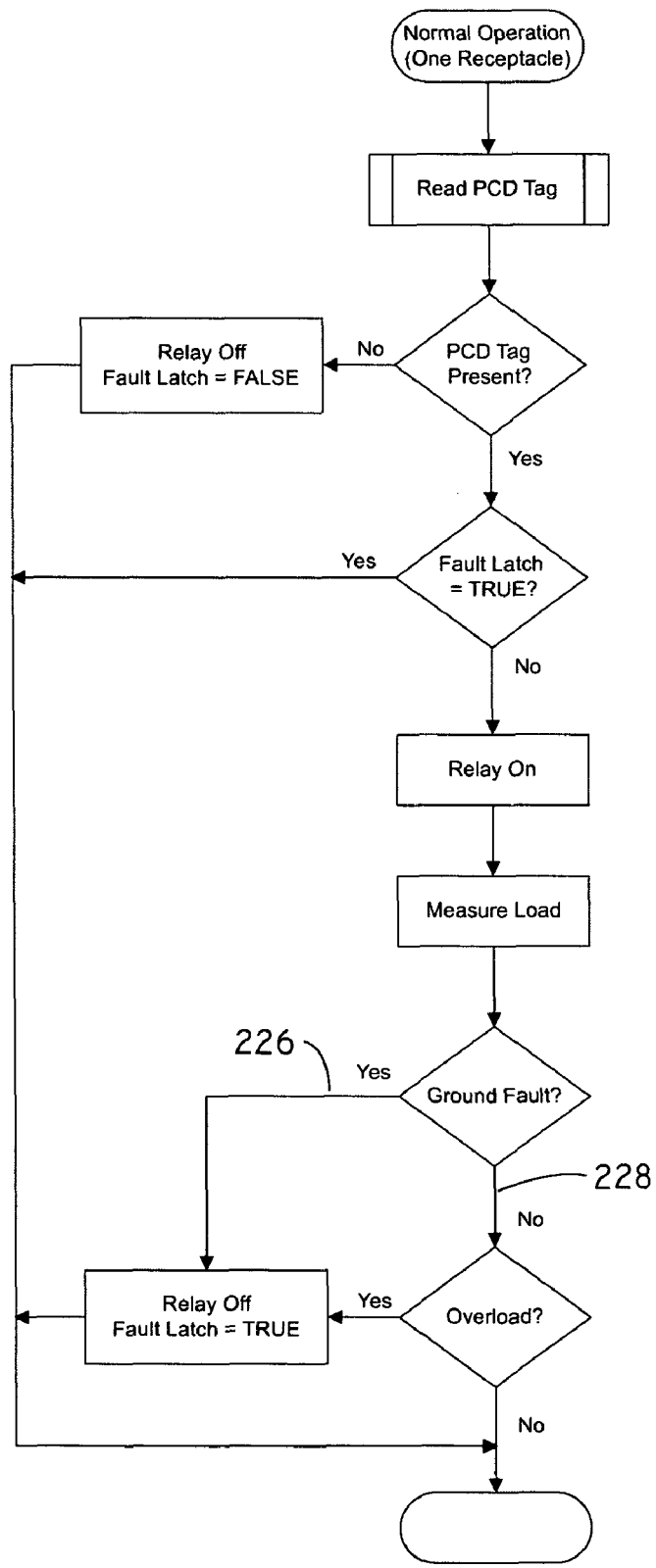
FIG. 13F is a flow chart illustrating a method of using another alternative embodiment of the system of the invention.
Figure 13G:
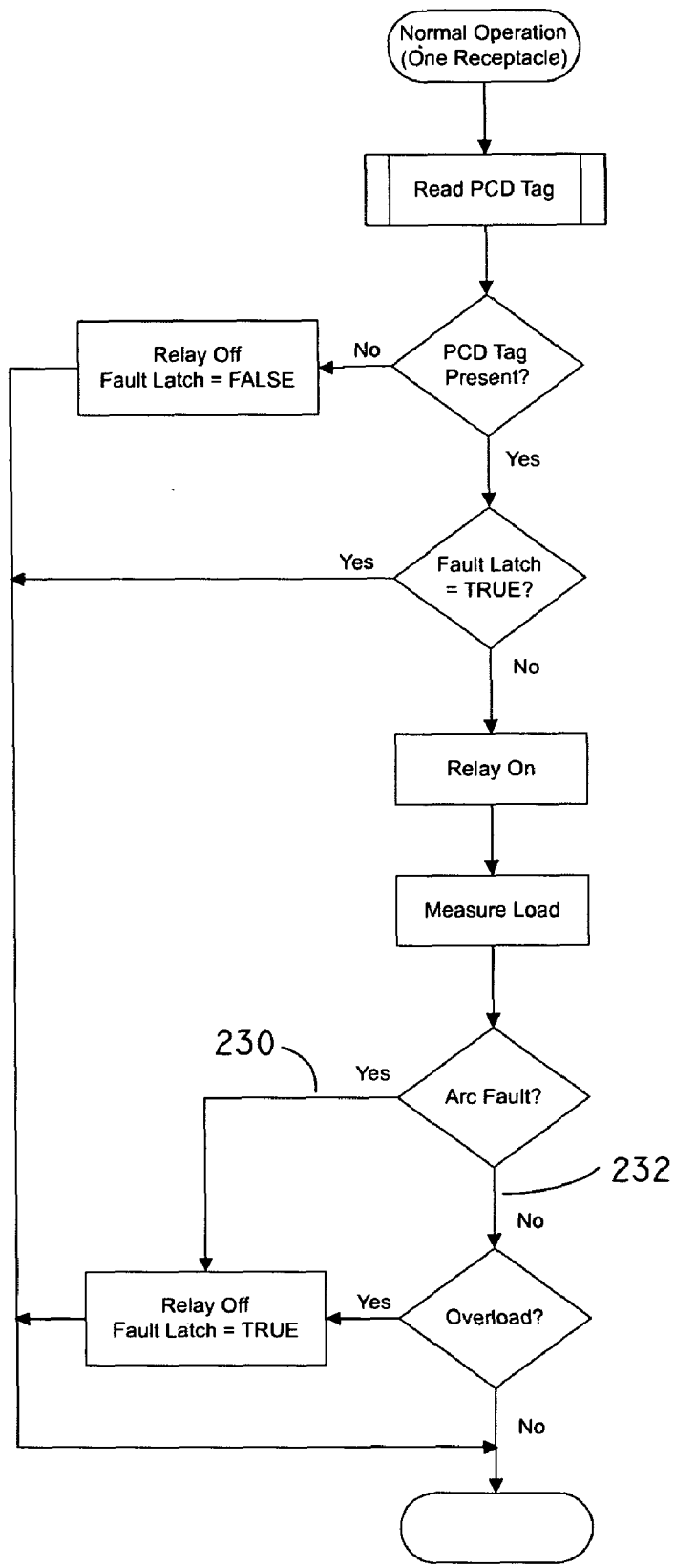
FIG. 13G is a flow chart illustrating a method of using another alternative embodiment of the system of the invention.
Figure 13H:
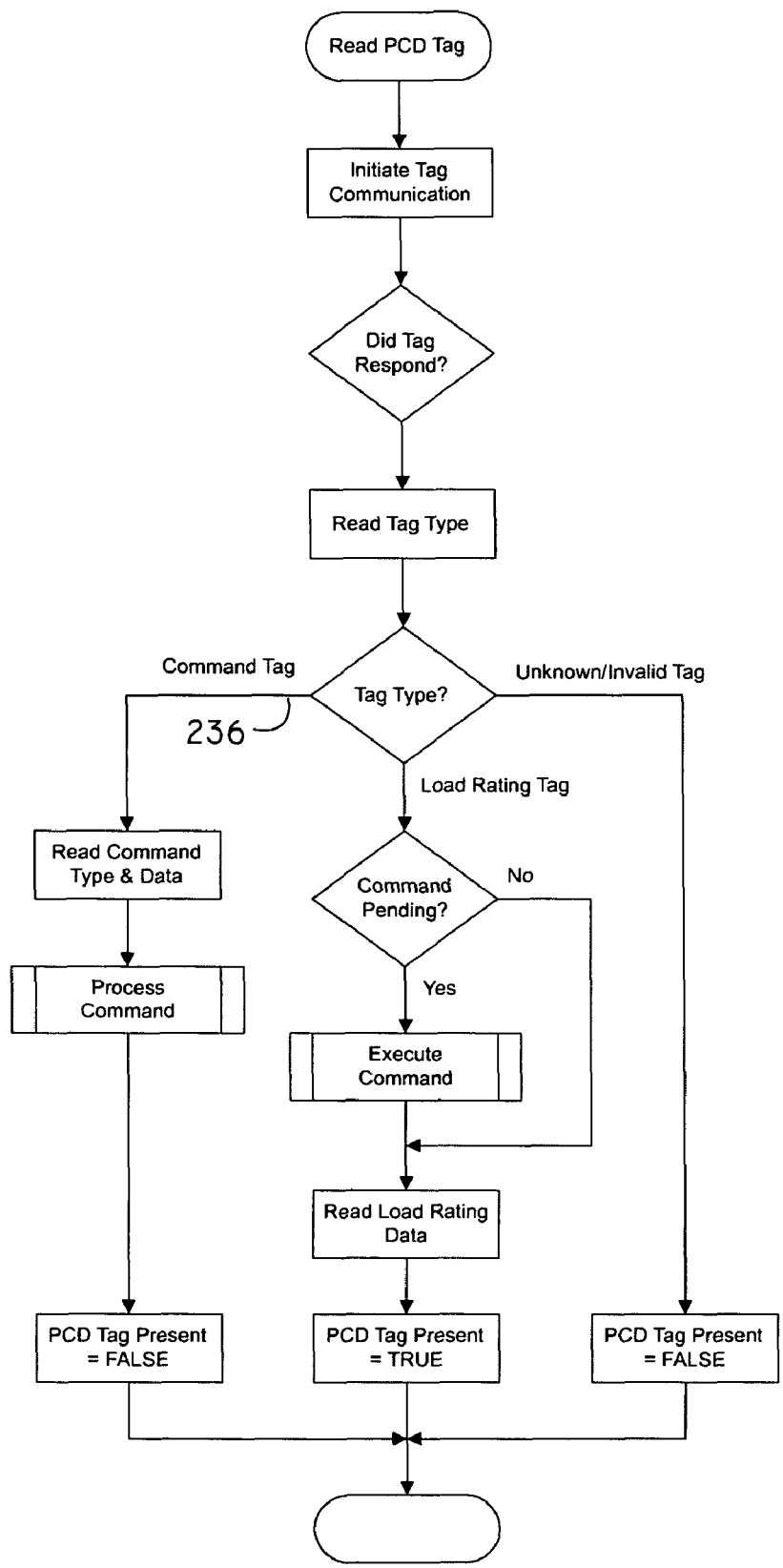
FIG. 13H is a flow chart illustrating a method of using another alternative embodiment of the system of the invention.

In another embodiment, once the receptacle 129 is connected with the source of electrical power (step 300 in FIG. 13D), the control circuit 127 proceeds to measure power quality (step 302 in FIG. 13D). The control circuit examines the power quality information independently for each receptacle (step 218 in FIG. 13E) and provides the disconnect signal to the switch device 123 if a power fault is detected (step 219 in FIG. 13E). Alternatively, if a power fault is not detected, the control circuit 127 then determines whether the delay timer has expired (step 222 in FIG. 13E). Preferably, the system includes a means for delaying connection of the receptacle 129 to the power source, for a selected time period. For instance, in one embodiment, the selected time period is preferably selected within a predetermined range based on data in the PCD tag memory which is read by the PCD reader. Alternatively, in another embodiment, the selected time period is selected within a predetermined range based on predetermined data stored in the control circuit. In one embodiment, the selected time period preferably is randomly selected from a predetermined range. In another embodiment, the selected time period is systematically selected from a predetermined range.

The system 115 preferably also includes a central controller 141 (FIG. 21) operatively connected to a plurality of receptacles, to which electrical devices 117 are connected. The central controller 141 controls connection of the receptacles to the power source so that connection times of the receptacles 129 to the power source are distributed throughout a predetermined time window.

In another embodiment, the data in the PCD tag memory preferably also includes minimum acceptable power quality characteristics for the electrical device 117. Upon the control circuit 127 determining that the minimum power quality characteristics are satisfied over a predetermined power quality test period, (step 224, FIG. 13E) a connect signal is sent to the switch device 123 by the control circuit 127, resulting in connection of the receptacle to the power source.

Figure 16:
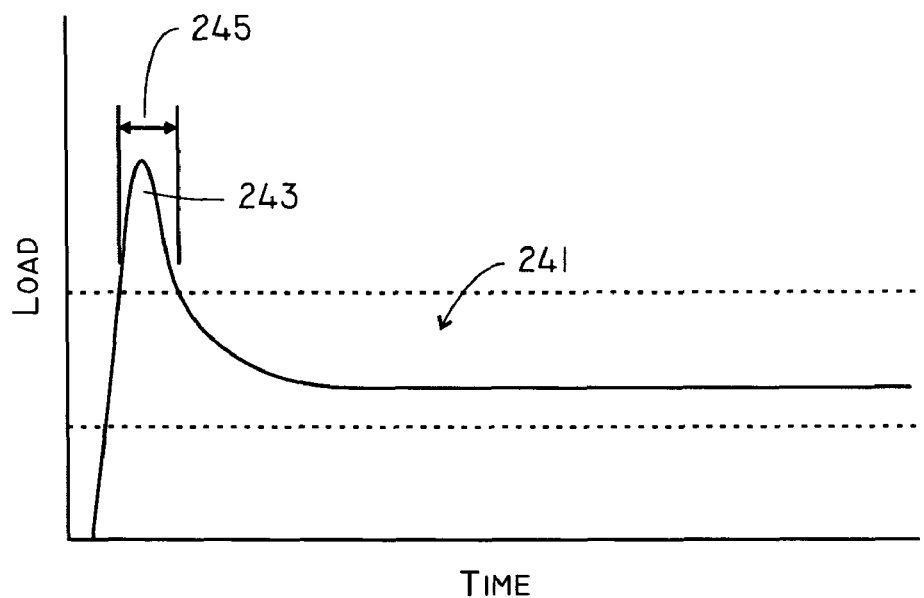
FIG. 16 is a graph showing a load profile for an electrical device.
Figure 17:
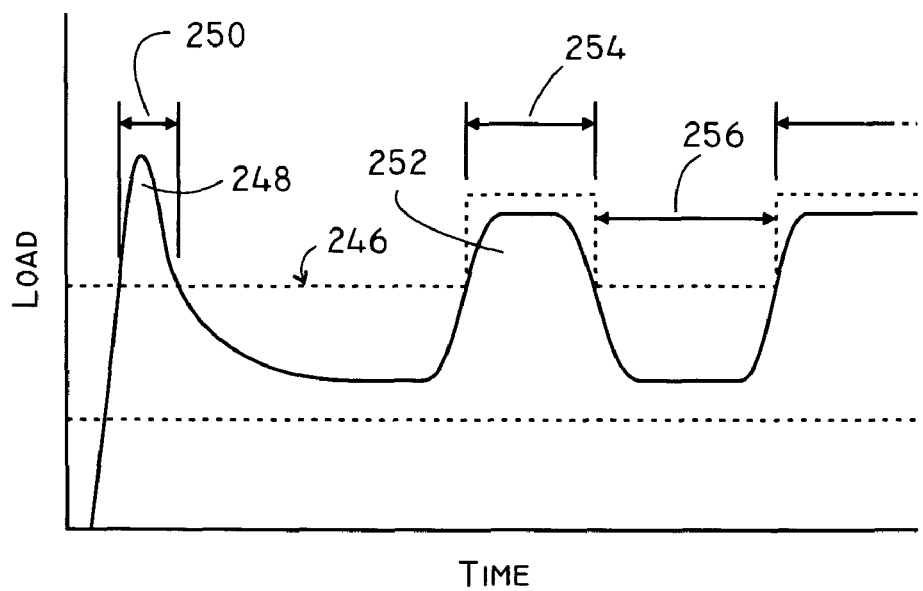
FIG. 17 is a graph showing the dynamic load characteristics of a complex load and the dynamic load profile of an acceptable actual load.

Measurement of the load presented by the electrical device may be more than a single measurement of current or power. For example, as shown in FIGS. 16 and 17, various electrical devices are known to have variable load level over time. A typical load profile 241 is shown in FIG. 16. The load profile 241 includes a relatively large startup load level 243. The large startup load level, although exceeding the electrical device load rating, is acceptable for a limited time period 245 (FIG. 16). This is accommodated by adapting the control circuit 127 to delay for a predetermined time interval 245 before detecting an overload condition, thereby allowing the load level to exceed the electrical device load rating throughout the delay interval.

In one embodiment, the data in the PCD tag memory preferably includes dynamic load profile information for the electrical device 117. Accordingly, the PCD reader obtains the dynamic load profile for the electrical device 117. The control circuit 127 compares the actual load over an appropriate preselected time period with the dynamic load profile (e.g., as shown in FIG. 16 or FIG. 17) to determine whether the actual load exceeds the dynamic load profile by at least a predetermined extent during the preselected time period. Also, the control circuit 127 preferably provides the disconnect signal upon determining that the actual load exceeds the dynamic load profile by at least the preselected extent during the preselected time period. One example of a dynamic load profile 246 is shown in FIG. 17. In addition to the large startup load level 248, which is acceptable for a limited time period 250, the load profile includes a second load level 252, although exceeding the basic load rating, does not exceed a second higher load rating, does not exceed duration 254 and recovery 256 time limits associated with the second higher load rating. This example illustrates a dynamic load profile containing only two load levels delineated by basic time constraints, however a dynamic load profile can include any number of load levels, transitions, timing parameters and other load characteristics such as power factor. The example shown in FIG. 17 with two different load levels is accomodated by adapting the control circuit 127 to first delay for a predetermined time interval 250 before detecting an overload condition providing the load level exceeds the electrical device load rating throughout the delay interval; and second, to delay for a predetermined time interval 254 before detecting an overload condition providing the load level exceeds the lower electrical device load rating and does not exceed the higher electrical device load rating throughout the delay interval; and third, to detect the load level exceeding the lower electrical device load rating within predetermined time interval 256. The time intervals and said lower and higher electrical device load ratings being stored in PCD tag memory. Similarly, other embodiments can be adapted to address any number of electrical device load ratings, time intervals and other measurable load parameters.

The system 115 preferably includes additional features. For example, the system preferably includes a ground fault detector circuit for detecting a ground fault. The ground fault detector circuit provides the disconnect signal to the switch device 123 upon detection of the ground fault (step 226 in FIG. 13E). If the ground fault detector circuit does not detect a ground fault, then the control circuit 127 proceeds to determine whether an overload condition exists (step 228 in FIG. 13F).

Preferably, the data in the PCD tag memory also includes preselected acceptable arc characteristics of the electrical device 117. In addition, the system preferably includes an arc fault detection circuit associated with the receptacle 129, for detecting actual arcing activity in the electrical device 117 or the branch circuit. For the purposes hereof, a source path circuit includes the electrical device and the branch circuit. It will be understood that the arcing activity could occur in the electrical device and/or anywhere else in the source path circuit. In this embodiment, the control circuit 127 preferably is adapted to compare the actual arcing activity over a preselected arcing time period with the preselected acceptable arc characteristics to determine whether the actual arcing activity exceeds the preselected acceptable arc characteristics by at least a preselected margin during the preselected arcing time period. Also, upon the control circuit determining that the actual arcing activity exceeds the preselected acceptable arc characteristics as indicated above, the control circuit 127 provides the disconnect signal (step 230 in FIG. 13G). In the event that the actual arcing activity does not exceed the preselected acceptable arc characteristics, the control circuit 127 next determines whether an overload exists (step 232 in FIG. 13G).

Various data may be included in the PCD tag memory, as desired, and the PCD reader can be programmed to ascertain whether such data is present in the PCD tag memory, and is in accordance with preselected parameters or characteristics which the PCD reader will look for. For example, the data in the PCD tag memory preferably includes safety certification data as a digital equivalent to the certification mark of a test laboratory. The control circuit 127 preferably is adapted to compare the safety certification data in the PCD tag memory with predetermined certification data. In the preferred embodiment, the control circuit 127 provides a connect signal (step 234 in FIG. 12) to the switch device 123 upon determining that the safety certification data matches with at least a preselected portion of the predetermined certification data. The connect signal causes the switch device 123 to connect the receptacle 129 with the power source.

Additional embodiments of the system of the invention are described below. In the following, elements are numbered so as to correspond to like elements in the foregoing description.

In another embodiment of a system 115 of the invention, the system 115 includes a command card 139. The command card 139 provides a command signal (step 236, in FIG. 13H) readable by the PCD reader 121.

It will be understood that, as with the PCD tag 119, the command card 139 provides the command signal (i.e., it is in communication with the PCD reader) upon the command card being located within a predetermined distance from the PCD reader 121.

It will also be understood that a variety of commands may be provided by the command card 139. Various exemplary command types are set out in FIG. 13I. For example, a command signal may cause the receptacle 129 to be connected to the power source, and to be enabled for a preselected enablement time period thereafter. Also, by way of example, the command card 139 can provided a command signal which causes data in the PCD tag 119 memory to be erased, so that the PCD tag 119 is in an unprogrammed condition. As a further example, the command card 139 can provide a command signal to cause a PCD tag 119 to be programmed or reprogrammed by the control circuit 127 to provide a predetermined load rating for an electrical device 117.

Figure 14:
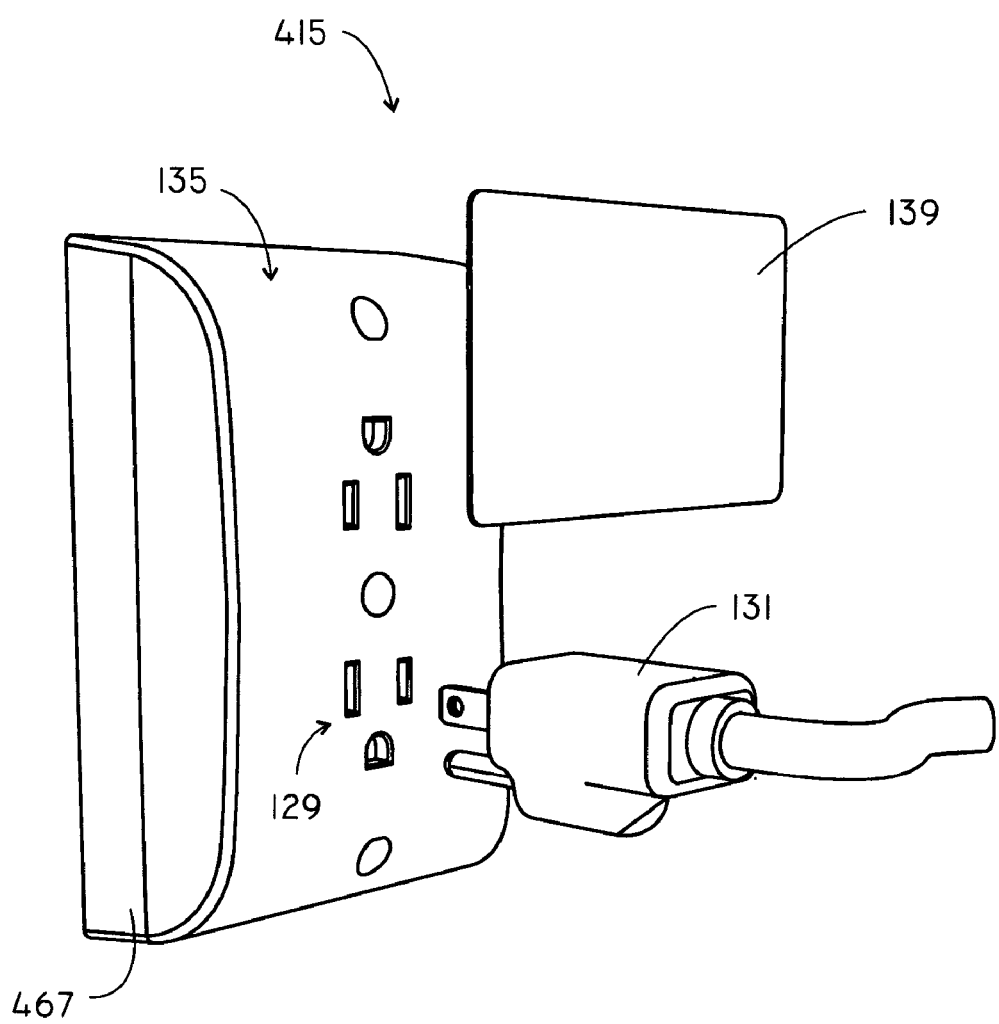
FIG. 14 is an isometric view of an alternative embodiment of an outlet of the invention, an embodiment of a plug incorporating the PCD tag of the invention, and an embodiment of a command card of the invention.

A PCD command card 139, shown in FIG. 14, contains a circuit substantially the same as that of the PCD tag 119. Preferably, the command card 139 contains special data that initiates a specific function within the outlet 135, or initiates action by the outlet 135. The command card 139 may be provided in various physical embodiments, e.g., placing the circuit on a plastic sheet, within a thin card, or inside a plastic clamshell. For instance, the command card 139 shown in FIG. 14 is in the form of a thin card.

The system 115 may, for example, include a night light incorporated into the outlet 135. Preferably, the night light is activatable by a command signal (FIG. 13I).

Figure 13I:
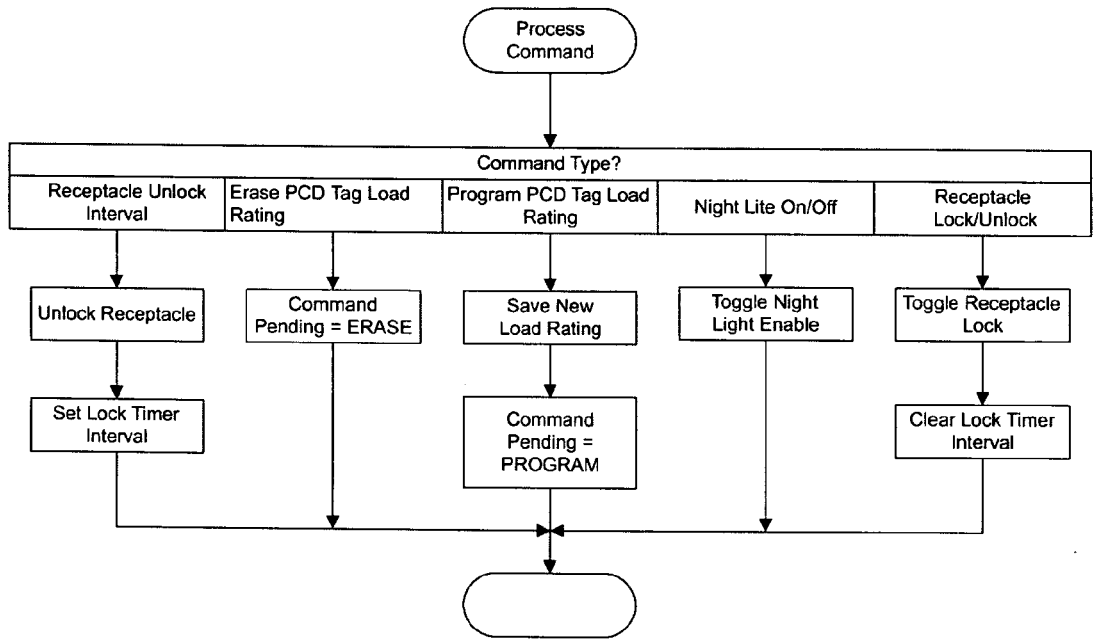
FIG. 13I is a flow chart illustrating a sub process step included in the flow chart of FIG. 13H.
Figure 13J:
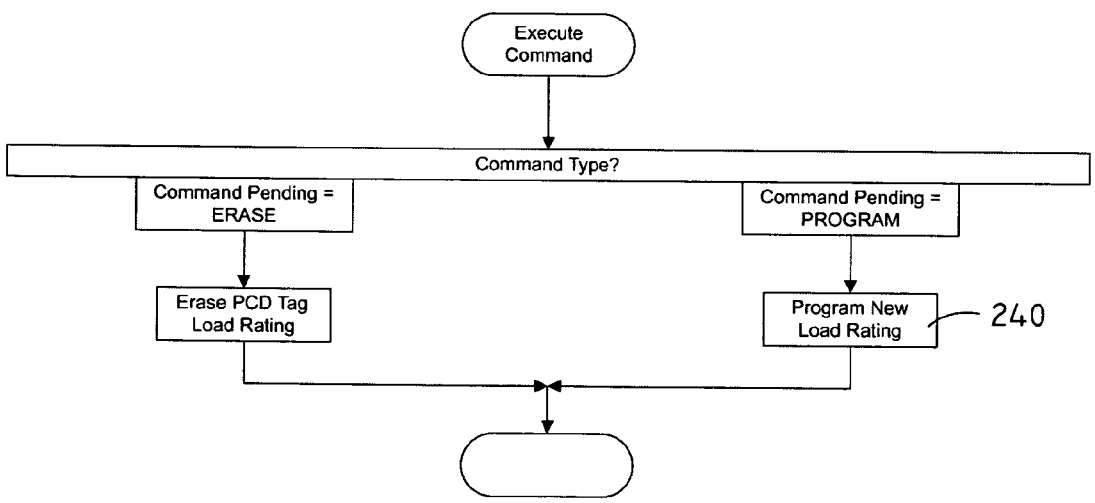
FIG. 13J is a flow chart illustrating a sub process step included in the flow chart of FIG. 13H.
Figure 13K:
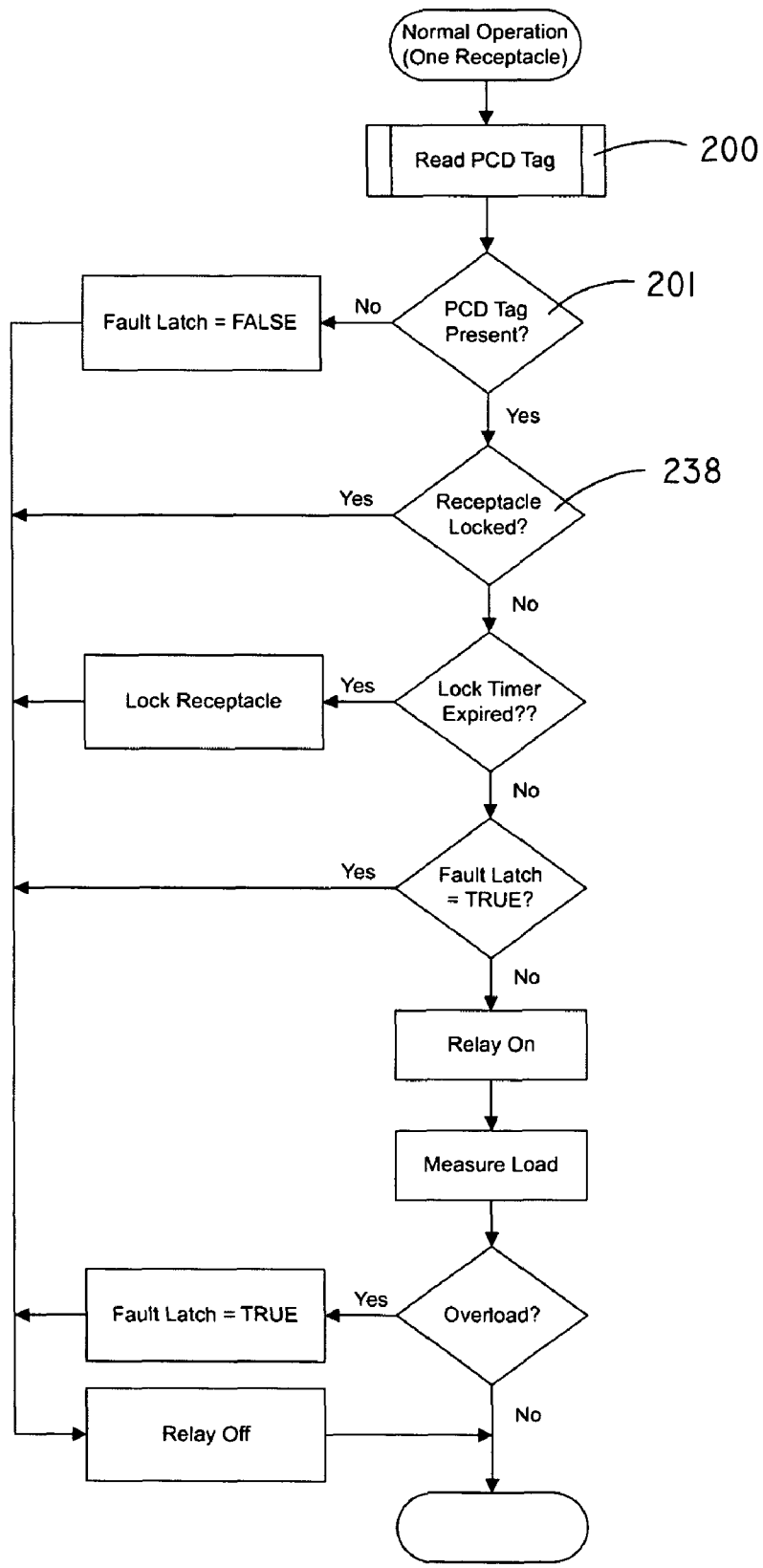
FIG. 13K is a flow chart illustrating a method of using another alternative embodiment of the system of the invention.

The receptacle is convertible by a predefined command signal between a locked condition, in which the receptacle 129 is not connectable to the power source, and an unlocked condition, in which the receptacle 129 is connectable to the power source, (FIG. 13I and FIG. 13K). For instance, the command card 139 may be used to lock a receptacle 129, and the control circuit 127, after determining that a PCD tag with valid information is present (steps 200, 201 in FIG. 13K) determines whether the receptacle is locked (step 238).

It will also be understood that the system provides for reprogramming of PCD tags (or programming, if the PCD tag is initially provided in an unprogrammed condition) and a "learning mode" in which the PCD tag is reprogrammed according to actual load, as shown in FIG. 13J. Preferably, the PCD tag 119 is programmable by the control circuit 127. It is preferred that the control circuit 127 writes selected data to the PCD tag memory. For example, the selected data may be based upon one or more performance characteristics of the electrical device 117. Such a performance characteristic could be, for example, the electrical device load rating (step 240 in FIG. 13J).

In the preferred embodiment of the system 115, when an unprogrammed PCD tag 119 is brought within the coupling range of the PCD reader 121, the control circuit 127 provides the connection signal to the switch device 123 and begins to monitor the load profile of the attached electrical device 117. Upon detecting the removal and subsequent reinsertion of the same PCD tag 119, the control circuit 127 stores the appropriate load profile information in the PCD tag 119 memory, rendering it programmed.

In another embodiment, the PCD tag memory is at least partially erasable by the control circuit 127, so that the PCD tag 119 is in an unprogrammed condition. The unprogrammed PCD tag is reprogrammable by the control circuit to provide a new load rating for the electrical device based on the actual load consumed by the electrical device. This is one aspect of the "learning mode" referred to above.

Preferably, the system also includes a memory storage means which is associated with the receptacle 129, in which receptacle data related to the receptacle 129 is stored in readable format. Also, the system preferably includes a means for communication (i.e., a programming device 154) with the memory storage means and the PCD tag 119. The means for communication is adapted for reading data from the PCD tag memory and for reading the receptacle data.

The programming device 154 is also adapted for erasing at least part of the data which is in the PCD tag memory. Also, the programming device can be used to reprogram the PCD tag memory. A physical embodiment of the programming device 154 is shown in FIGS. 20A-20D.

A preferred physical embodiment of the PCD tag 119 is shown in FIG. 8. Preferably, the PCD tag includes a chip 171 and an antenna 173. The PCD tag preferably is a printed circuit board with apertures 175, 177 therein, in which prongs of the receptacle 129 are receivable.

The invention also includes the plug 131. As is known in the art, the plug is electrically connectable to the electrical device, and the plug is also receivable in the receptacle 129 and electrically connectable therewith. The plug 131 of the invention includes the PCD tag 119, in which data related to the electrical device is stored in a format readable by the PCD reader 121 associated with the receptacle 129.

The PCD tag 119 is positionable relative to the plug and the receptacle in various ways. For instance, the PCD tag can be attached to the plug, or positioned relative to the plug, or included in a body 155 of the plug 131.

In one embodiment, the PCD tag 119 of the invention is positionable relative to the receptacle 129 in a predetermined position, so as to permit the PCD reader 121 to read the data in the PCD tag 119. In another embodiment, the PCD tag 119 preferably is located in an adapter 157 (FIG. 10) which is positionable between the receptacle 129 and the plug 131, for electrically connecting the electrical device to the receptacle 129 via the plug 131 and the adaptor 157.

Figures 9A, 9B, 9C:
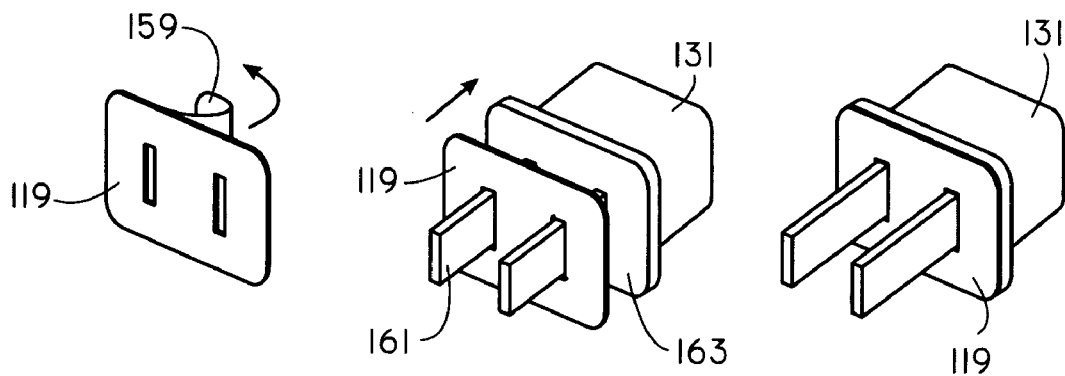
FIG. 9A is an isometric view of an alternative embodiment of the PCD tag of the invention, with an adhesive portion on an inward side thereof.
FIG. 9B is an isometric view of the PCD tag of FIG. 9A in position to be placed on a plug.
FIG. 9C is an isometric view of the PCD tag of FIG. 9A adhered to the plug of FIG. 9B.

In an alternative embodiment, the PCD tag 119 has an adhesive back portion revealed when a covering 159 is removed, as shown in FIG. 9A. Once the covering 159 has been removed, the PCD tag 119 is inserted over prongs 161 of the plug 131 until the PCD tag 119 engages a front surface 163 of the plug 131. Upon engagement, the side of the PCD tag 119 with adhesive thereon adheres to the surface 163. Preferably, the plug is connected to an electrical cord 165 which is adapted for electrical connection to the electrical device.

Figures 10, 11:
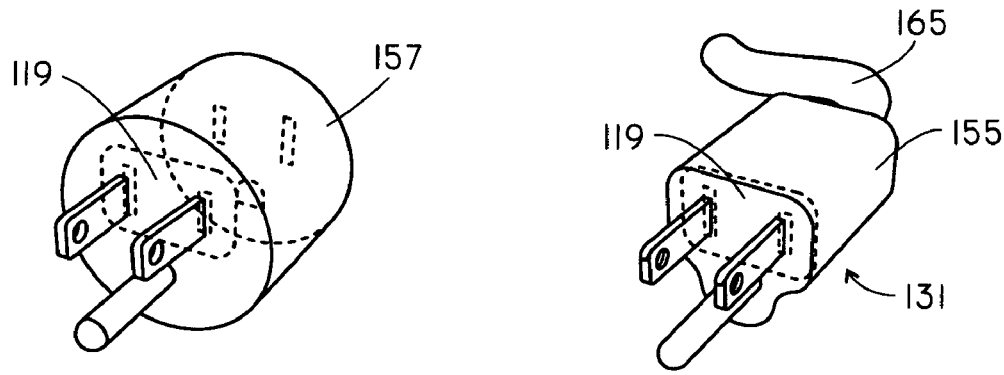
FIG. 10 is a partial isometric view of an embodiment of an in-line adaptor including a PCD tag therein.
FIG. 11 is an isometric view of an embodiment of a plug of the invention in which the PCD tag of FIG. 8 is incorporated in a body of the plug.

In the preferred embodiment, the PCD tag 119 is incorporated in the body 155 of the plug 131 (FIG. 11).

It will be understood that the outlet of the invention can be provided in various physical embodiments. For instance, the outlet 135 may be an in-wall outlet, or it may be provided as a type of adaptive outlet in a system 415 (FIG. 14). The adaptive outlet has a body 467. The body 467 has prongs (not shown) in the body 467 which are electrically connectable to receptacles (e.g., in a prior art in-wall outlet). This permits the adaptive outlet to be positioned on, for example, the prior art in-wall outlet.

Figure 15:
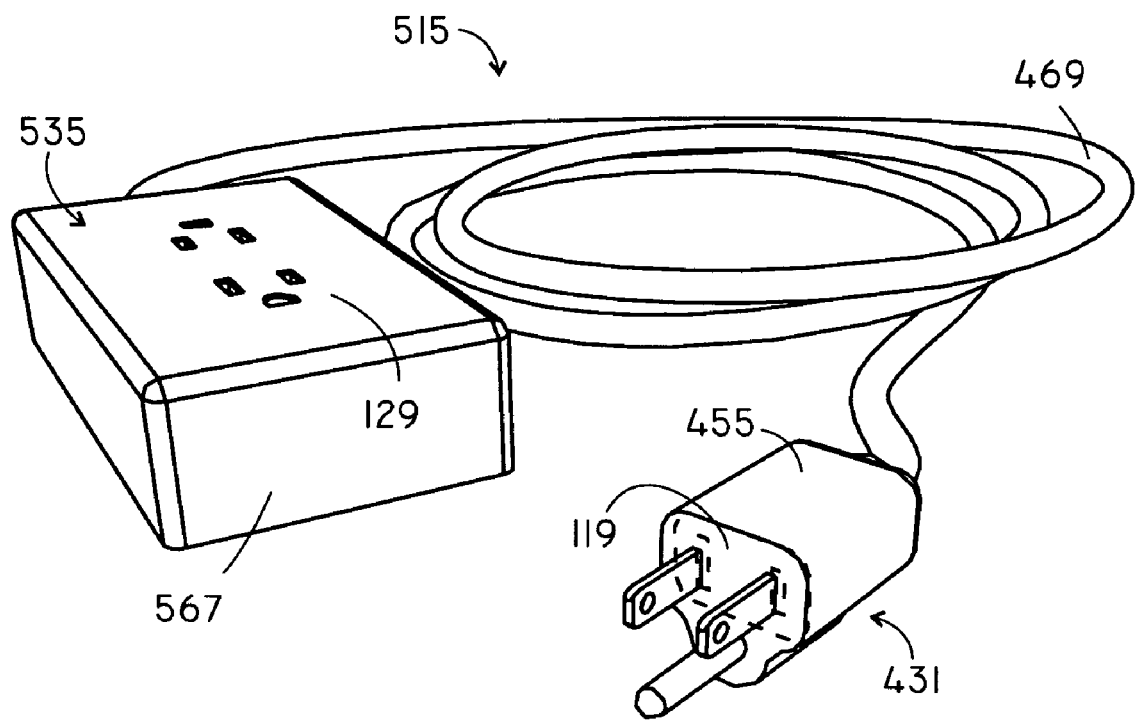
FIG. 15 is an isometric view of an alternative embodiment of an outlet of the invention.

An alternative physical embodiment of a system 515 of the invention is shown in FIG. 15. In this embodiment, an outlet 535 is located in a body 567 for use as a power strip. The body 567 is adapted to be positioned, e.g., on a floor, for example. As shown, the outlet 535 includes two receptacles 129, but it will be understood that the outlet 535 may include as many receptacles as required. The outlet 535 is electrically connected to a plug 431 by an electrical cord 469. Preferably, the PCD tag 119 is positioned in a body 455 of the plug 431.

Figure 18:
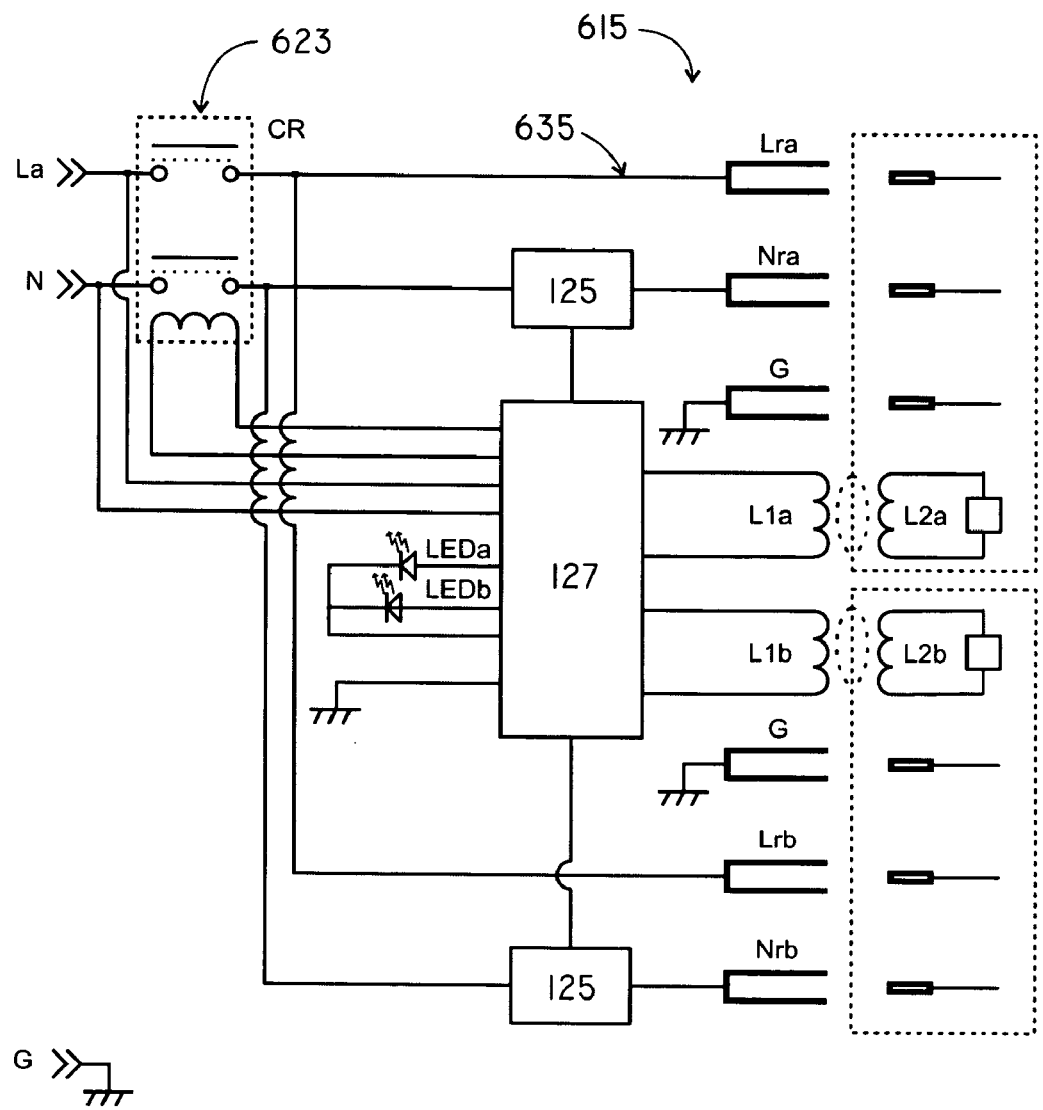
FIG. 18 is a block diagram of an alternative embodiment of the system of the invention.
Figure 19:
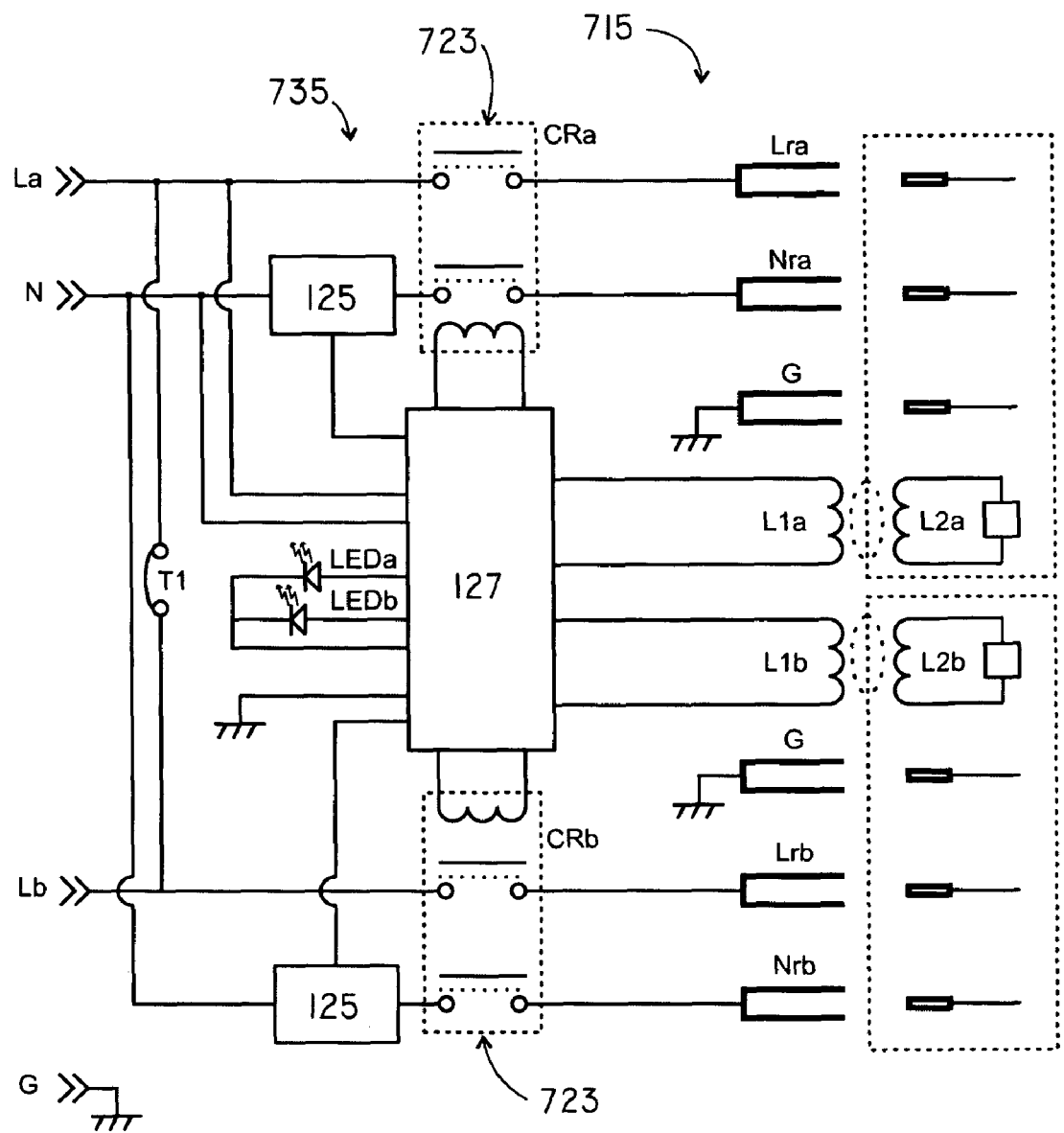
FIG. 19 is a block diagram of another alternative embodiment of the system of the invention.
Figure 20A:
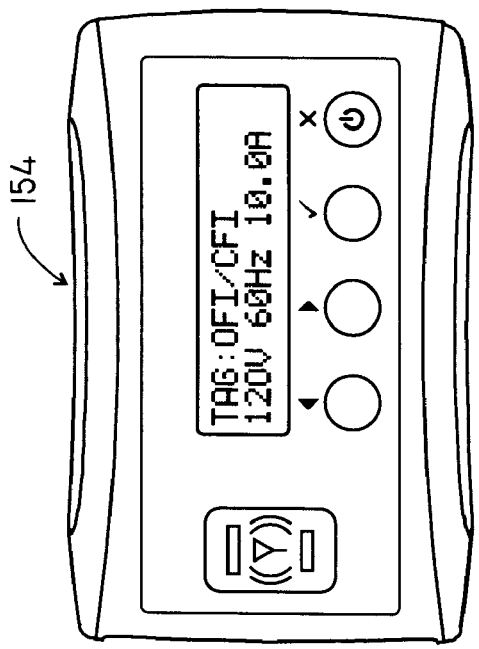
FIG. 20A is a front view of an embodiment of a means for communicating with the PCD tag of the invention and outlet of the invention.
Figure 20B:
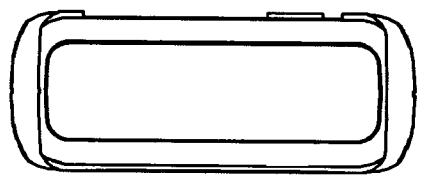
FIG. 20B is an end view of the communication device embodiment of FIG. 20A.
Figure 20C:
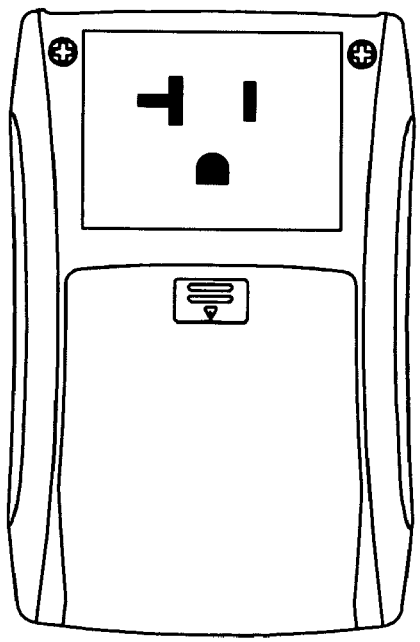
FIG. 20C is a back view of the communication device embodiment of FIG. 20A.
Figure 20D:
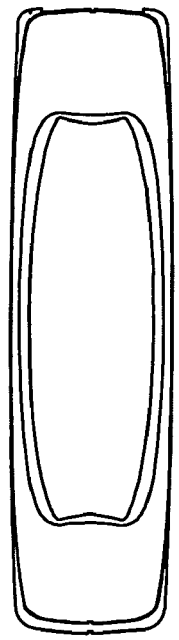
FIG. 20D is a side view of the communication device embodiment of FIG. 20A.

FIGS. 18 and 19 are functional block diagrams of additional alternative embodiments of the system of the invention. In FIG. 19, the system 615 includes a switch device 623 which can close all receptacles in the outlet 635. (Although the preferred embodiment includes a single pole switch device 123 for each receptacle connecting only the live supply wire L to the live receptacle terminal Lr, system 615 (FIG. 19) employs dual-pole switch devices 123 connecting both live L and neutral N supply wires to the receptacle terminals.) In FIG. 18, a system 715 includes an outlet 735 with switch devices 723 therein in which, in the exemplary switch devices shown, the line and neutral wires are both switched in each case. (System 715 (FIG. 18) employs one dual pole switch device connecting the live L and neutral N supply wires to both receptacles simultaneously.)

It will be appreciated by those skilled in the art that the invention can take many forms, and that such forms are within the scope of the invention as claimed. Therefore, the spirit and scope of the appended claims should not be limited to the description of the preferred versions contained herein.

We claim:

1. An electrical power distribution system for connecting an electrical device, having a predetermined electrical load rating, electrically connected to an electrical plug, to a source of electrical power and disconnecting the electrical device therefrom, the system comprising:
   a PCD tag carried by a plug connected to the electrical device, the PCD tag comprising a PCD tag memory in which data related to the electrical device is stored in a format readable by the PCD reader, said data comprising an electrical device load rating for the electrical device that is used to program the value of a disconnect signal;
   a PCD reader associated with at least one electrical receptacle electrically connectable to the source of electrical power, said at least one receptacle having a predetermined maximum electrical receptacle load rating and being adapted to receive said electrical plug electrically connected to the electrical device;
   at least one switch device for connecting said at least one electrical receptacle to the source of electrical power and for disconnecting said at least one electrical receptacle from the source of electrical power upon receipt of said disconnect signal, wherein the value of said disconnect signal is determined to be the lower of the data stored in said PCD tag carried by the electrical plug and the maximum electrical receptacle load rating so that the same electrical receptacle can be used for electrical devices having different electrical load ratings that do not exceed the maximum electrical load rating of the electrical receptacle;
   at least one measuring device for measuring actual current presented through said at least one electrical receptacle by the electrical device; and
   a control circuit adapted to compare said actual load current of said electrical device to said electrical load rating of said electrical device stored in said PCD tag and said maximum electrical receptacle load rating to provide said disconnect signal based upon the lower of said electrical load rating of said electrical device stored in said PCD tag and said maximum electrical receptacle load rating to said at least one switch device upon said actual current load exceeding the lower of said electrical load rating of said electrical device as stored in said PCD tag memory and said maximum electrical receptacle load rating.

2. A system according to claim 1 in which, upon disconnection of said at least one electrical receptacle, said at least one electrical receptacle is in a disconnected condition in which said at least one electrical receptacle is not connectable to the source of electrical power until said at least one electrical receptacle is converted to a reset condition, in which said at least one electrical receptacle is connectable to the source of electrical power.

3. A system according to claim 2 in which removal of the electrical plug from said at least one electrical receptacle converts said at least one electrical receptacle to the reset condition.

4. A system according to claim 1 in which said disconnect signal is provided to said at least one switch device upon the control circuit determining that said actual current exceeds said electrical device load rating over a predetermined time period.

5. A system according to claim 1 additionally comprising: at least one electrical outlet, said at least one electrical outlet comprising said at least one electrical receptacle, said at least one electrical outlet having a maximum outlet load rating; and the control circuit being adapted to compare said actual current to each of said electrical load rating of said electrical device and said maximum outlet load rating, and to provide the disconnect signal to said at least one switch device upon said actual current exceeding either said electrical load rating of said electrical device or said maximum outlet load rating.

6. A system according to claim 1 additionally comprising:
   at least one electrical outlet, said at least one electrical outlet comprising said at least one electrical receptacle, said at least one electrical outlet having a maximum electrical outlet load rating; said at least one electrical receptacle being electrically connected with a plurality of electrical devices; and the control circuit being adapted to compare said actual current to said maximum electrical outlet load rating, and to provide the disconnect signal to said at least one switch device upon said actual current exceeding said maximum electrical outlet load rating.

7. A system according to claim 1 in which: said data in the PCD tag memory comprises a dynamic load profile for the electrical device; the control circuit compares said actual current over a preselected time period with the dynamic load profile to determine whether said actual current exceeds the dynamic load profile by at least a preselected extent during the preselected time period; and the control circuit is adapted to provide the disconnect signal to said at least one switch device upon determining that said actual current exceeds the dynamic load profile by at least the preselected extent during the preselected time period.

8. A system according to claim 1 in which: said data in the PCD tag memory comprises preselected acceptable arc characteristics of the electrical device; the system additionally comprises a source path circuit, the source path circuit comprising the electrical device and electrical conductors electrically connected between the electrical device and the source of electrical power; the system additionally comprises an arc fault indicator circuit associated with said at least one receptacle, for detecting actual arcing activity in the source path circuit; the control circuit is adapted to compare said actual arcing activity over a preselected arcing time period with said preselected acceptable arc characteristics to determine whether said actual arcing activity exceeds the preselected acceptable arc characteristics by at least a preselected margin during the preselected arcing time period; and the control circuit is adapted to provide the disconnect signal to said at least one switch device upon determining that said actual arcing activity exceeds the preselected acceptable arc characteristics by at least the predetermined margin during the preselected arcing time period.

9. A system according to claim 1 in which: said data in the PCD tag memory comprises safety certification data; the control circuit is adapted to compare said safety certification data with predetermined certification data, and to provide a connect signal to said at least one switch device upon determining that said safety certification data matches with at least a preselected portion of said predetermined certification data; and said connection signal causes said at least one switch device to connect said at least one receptacle with the source of electrical power.

10. A system according to claim 1 in which the PCD tag is programmable by the control circuit.

11. A system according to claim 1 in which the control circuit writes selected data to the PCD tag memory.

12. A system according to claim 11 in which said selected data is based upon at least one performance characteristic of the electrical device.

13. A system according to claim 1 in which the PCD tag memory is at least partially erasable by the control circuit, such that the PCD tag is in an unprogrammed condition.

14. A system according to claim 13 in which the PCD tag is reprogrammable by the control circuit to provide a new load rating for the electrical device based on actual current consumed by the electrical device.

15. A system according to claim 1 additionally including a command card adapted to provide at least one command signal readable by the PCD reader, said at least one command signal being transmitted to the control circuit from the PCD reader.

16. A system according to claim 15 in which the command card provides said at least one command signal upon the command card being located within a predetermined distance from the PCD reader.

17. A system according to claim 15 in which said at least one command signal causes said at least one receptacle to be connected to the source of electrical power and enabled for a preselected enablement time period.

18. A system according to claim 15 in which said at least one command signal causes data in the PCD tag memory to be erased, such that the PCD tag is in an unprogrammed condition.

19. A system according to claim 15 in which said at least one programming command signal causes the PCD tag to be programmed by the control circuit to provide a predetermined load rating for the electrical device based on actual current consumed by the electrical device.

20. A system according to claim 15 additionally comprising a night light activatable by said at least one command signal.

21. A system according to claim 15 in which said at least one electrical receptacle is convertible by said at least one command signal between a locked condition, in which said at least one electrical receptacle is not connectable to the source of electrical power, and an unlocked condition, in which said at least one electrical receptacle is connectable to the source of electrical power.

22. A system according to claim 1 additionally comprising a night light.

23. A system according to claim 1 additionally comprising: a ground fault detector circuit for detecting a ground fault; and the ground fault detector circuit being adapted to provide the disconnect signal to said at least one switch device upon detection of the ground fault.

24. A system according to claim 1 additionally comprising: a detector for detecting at least one power fault in the electrical power provided to said at least one electrical receptacle; and the detector being adapted to provide the disconnect signal to said at least one switch device upon detection of said at least one power fault.

25. A system according to claim 24 additionally comprising a system for delaying connection of said at least one electrical receptacle to the source of electrical power for a selected time period after disconnection due to detection of a power fault.

26. A system according to claim 25 in which said selected time period is selected within a predetermined range based on data in the PCD tag memory read by the PCD reader.

27. A system according to claim 25 in which said selected time period is selected within a predetermined range based on data in the control circuit.

28. A system according to claim 25 in which said selected time period is randomly selected from a predetermined range.

29. A system according to claim 25 in which said selected time period is systematically selected from a predetermined range.

30. A system according to claim 25 in which said selected time period is selected by a central controller such that connection of said at least one electrical receptacle to the source of electrical power is sequential relative to connection of one or more other electrical receptacles to the source of electrical power.

31. A system according to claim 24 in which said data in the PCD tag memory includes minimum acceptable power quality characteristics for the electrical device and said at least one switch device connects said at least one electrical receptacle to the source of electrical power upon the control circuit determining that said minimum acceptable power quality characteristics are satisfied over a predetermined power quality test period.

32. A system according to claim 1 additionally comprising: memory storage associated with said at least one electrical receptacle in which receptacle data related to said at least one electrical receptacle is stored in readable format; wherein said control circuit is configured to read data from said PCD tag memory and for reading said receptacle data.

33. A system according to claim 32, wherein said control circuit is configured to erase said data in said PCD tag memory.

34. A system according to claim 32 in which said control circuit is adapted for erasing said data in said PCD tag memory and reprogramming said PCD tag memory.

35. A system according to claim 1 in which: a plurality of electrical devices are electrically connected to at least one electrical outlet, said at least one electrical outlet comprising said at least one electrical receptacle; said at least one electrical outlet has a maximum outlet load rating; said at least one measuring device measures total current presented through said at least one electrical outlet by said plurality of electrical devices; and the control circuit is adapted to compare said total current to said maximum outlet load rating, and to provide the disconnect signal to said at least one switch device upon said total current exceeding said maximum outlet load rating.

36. A system according to claim 1 in which: a plurality of electrical devices are electrically connected to at least one electrical outlet, each of said electrical devices having a respective electrical load rating; said at least one outlet electrical comprising said at least one electrical receptacle; said at least one measuring device measures actual load presented through said at least one electrical outlet by each said electrical device respectively; and the control circuit is adapted to compare said actual current presented by each of said electrical devices respectively to said respective electrical load rating for each said electrical device, and to provide the disconnect signal to said at least one switch device upon said actual current consumed by each said electrical device respectively exceeding said respective electrical load rating for each of said electrical devices.

37. The electrical power distribution system as recited in claim 1, wherein said switch is normally open and said control circuit is configured to generate a connect signal when said PCD tag is in range of said PCD reader and said switch is configured to close in response to said connect signal.

38. An electrical power distribution system for connecting a plurality of electrical devices to a source of electrical power, the system comprising
a plurality of electrical outlets, each electrical outlet having a maximum electrical outlet load rating and comprising at least one electrical receptacle;
each electrical receptacle being adapted to receive an electrical plug electrically connected to one of said electrical devices;
each electrical device having a PCD tag carried by a plug connected to the electrical device, each PCD tag comprising a PCD tag memory in which data related to each of said electrical devices respectively is stored in a format readable by each said PCD reader respectively, said data comprising an electrical load rating for said electrical device respectively;
each electrical outlet having a PCD reader associated therewith;
each electrical outlet comprising at least one switch device for connecting each of said electrical outlets to the source of electrical power and for disconnecting each of said electrical outlets from the source of electrical power upon receipt of said disconnect signal, wherein the value of said disconnect signal is the lower of the data in said PCD tag and the maximum electrical outlet load rating;
each outlet comprising at least one measuring device for measuring actual current presented through each of said electrical outlets respectively by said electrical devices connected to each said outlet respectively; and
each outlet comprising a control circuit adapted to compare such actual load to said electrical device load rating as stored in said PCD tag memory for each said electrical device connected with each outlet respectively, and to provide the disconnect signal to at least one switch device upon said actual load exceeding said electrical device load rating.

39. A system according to claim 38 additionally comprising: a detector associated with each of said electrical outlets, for detecting at least one power fault in the source of electrical power provided to each of said electrical outlets respectively; and the detector being adapted to provide the disconnect signal to said at least one switch device in each of said electrical outlets respectively upon detection of said at least one power fault.

40. A system according to claim 39 additionally comprising a circuit for delaying connection of each of said electrical outlets to the source of electrical power for a selected time period after disconnection due to detection of a power fault.

41. A system according to claim 40 in which said selected time period is selected by a central controller such that connection of each of said electrical receptacles to the source of electrical power is sequential.

42. An electrical plug electrically connectable to an electrical device, the plug being receivable in at least one electrical receptacle having a maximum electrical receptacle load rating and which includes a PCD reader, a switch for connecting the electrical receptacle to a source of electrical power, a current measurement circuit and a control circuit for disconnecting the electrical receptacle from the source of electrical power when the electrical current through the electrical receptacle exceeds an electrical load rating, the electrical plug including a PCD tag comprising a PCD tag memory in which data related to the electrical device is stored in a format readable by a PCD reader associated with said at least one electrical receptacle, said data comprising an electrical load rating for the electrical device, said load rating being read, wherein the lower of said data in said PCD tag memory and said maximum electrical receptacle load rating is used to program the value at which said electrical receptacle is disconnected from said source of electrical power.

43. A PCD tag for use in an electrical power distribution system that includes a mating electrical receptacle, the PCD tag carried by an electrical plug having a conventional profile and a mating face for mating with an electrical receptacle having a electrical receptacle load rating and a switch for disconnecting said electrical receptacle from a source of electrical power, the PCD tag comprising a circuit assembly which includes a PCD tag memory in which data related to an electrical device is stored in a format readable by a PCD reader associated with at least one electrical receptacle, said data comprising an electrical load rating for the electrical device, wherein the lower of said data stored in said PCD tag memory and said electrical receptacle load rating is used to program the value at which said electrical receptacle is disconnected from said source of electrical power.

44. A PCD tag according to claim 43 positionable relative to said at least one electrical receptacle in a predetermined position to permit the PCD reader to read said data in said PCD tag memory.

45. A PCD tag according to claim 43 located in an adaptor which is positionable between the electrical receptacle and an electrical plug electrically connected to the electrical device, said adaptor being adapted for electrically connecting the electrical device to the electrical receptacle via said electrical plug.

46. A PCD tag according to claim 43 secured to an electrical plug receivable in the electrical receptacle.

47. A PCD tag according to claim 46 in which the electrical plug is electrically connected to an electric cord adapted for electrically connecting the electrical device to the electrical plug.

48. A PCD tag according to claim 43 which is embedded within a body of an electrical plug receivable in the electrical receptacle.

49. A PCD tag according to claim 43 adapted to be attached to an existing electrical plug.

50. The PCD tag as recited in claim 49, wherein said circuit assembly is generally parallel to said mating face of said electrical plug.

51. The PCD tag as recited in claim 43, wherein said circuit assembly includes a pair of spaced apertures configured to receive a pair of prongs on an electrical plug to enable said circuit assembly to be juxtaposed adjacent a mating face of said plug.

52. The PCD tag as recited in claim 51, further including an adhesive for attaching said circuit assembly to said electrical plug.

53. A PCD tag according to claim 43, wherein said circuit assembly includes a printed circuit board.

54. An electrical outlet for connecting at least one electrical device to a source of electrical power and disconnecting said at least one electrical device therefrom, the electrical outlet comprising:
    at least one electrical receptacle having an electrical receptacle load rating and being electrically connectable to the source of the electrical power, said at least one electrical receptacle being adapted to receive an electrical plug electrically connected to said at least one electrical device, said at least one electrical device having a PCD tag carried by said plug,
    the PCD tag comprising a PCD tag memory in which data related to said at least one electrical device is stored, said data comprising an electrical device load rating for said at least one electrical device; at least one switch device for connecting said at least one receptacle to the power source and for disconnecting said at least one receptacle from the power source upon receipt of a disconnect signal;
    a control circuit for comparing the current through said at least one receptacle and generating said disconnect signal if the current through said at least one receptacle exceeds the lower of said electrical receptacle load rating or said electrical load rating of said electrical device;
    a measuring device for measuring current through said at least one electrical receptacle by said at least one electrical device, and for communicating said measured current to the control circuit;
    a PCD reader for reading at least a portion of said data and communicating said portion to the control circuit, said portion including said electrical load rating of said electrical device.

55. An electrical power distribution system for connecting an electrical device to a source of electrical power and disconnecting the electrical device therefrom, the system comprising:
    a PCD tag carried by a plug electrically connected to the electrical device, the PCD tag comprising a PCD tag memory in which data related to the electrical device is stored in a format readable by the PCD reader, said data comprising an electrical device current rating for the electrical device;
    a PCD reader associated with at least one electrical receptacle having an electrical receptacle load rating and being electrically connectable to the source of electrical power, said at least one electrical receptacle being adapted to receive an electrical plug electrically connected to the electrical device;
    at least one switch device for connecting said at least one electrical receptacle to the source of electrical power and for disconnecting said at least one electrical receptacle from the power source upon receipt of a disconnect signal;
    a measuring device for measuring the current drawn from said at least one electrical receptacle by the electrical device; and
    a control circuit adapted to compare said drawn by said electrical device load rating as stored in said PCD tag memory, and to provide the disconnect signal to said at least one switch device upon said current exceeding the lower of said electrical load rating of said electrical device and said electrical receptacle load rating.

56. An electrical power distribution system comprising:
    an electrical receptacle for receiving an electrical plug,
    a switch for disconnecting said electrical receptacle from a source of electrical power in response to a disconnect signal;
    a measuring device for measuring the magnitude of electrical current flowing through the electrical receptacle;
    a PCD tag reader for reading a remote PCD tag carried by a plug connected to an electrical device, said PCD tag reader configured to read said PCD tag when said PCD tag is brought within range of said PCD tag reader; said PCD tag pre-programmed with data representative of an electrical load rating of the electrical device connected to said electrical plug used to configure the value of current which causes a disconnect signal to be generated; and
    a control circuit for generating a disconnect signal when the electrical current flowing through the electrical receptacle exceeds the lower of value the pre-programmed in said PCD tag or the electrical receptacle load rating, said control circuit further configured to generate a disconnect signal at different electrical current values depending on the value in the PCD tag associated with the electrical device whose electrical plug is in proximity of the PCD tag reader.

57. A method of programming an electrical power distribution system which includes an electrical receptacle having an electrical receptacle load rating, a switch for disconnecting said electrical receptacle from a source of electrical power, a measuring device for measuring the electrical current flowing through the electrical receptacle, a PCD tag reader for reading PCD tags carried by plugs that are connected to an electrical device and a control circuit for comparing the electrical current flowing through said electrical receptacle with a load rating value of said electrical device and said electrical receptacle load rating and generating a disconnect signal to disconnect said receptacle from said electrical power source when said electrical current flowing through said electrical receptacle exceeds the lower of said load rating value as stored in the PCD tag memory and said electrical receptacle load rating, the method comprising the step of programming the load rating value in said PCD tag.

* * * * *